United States Patent
Aghdasi et al.

(10) Patent No.: US 12,547,948 B2
(45) Date of Patent: Feb. 10, 2026

(54) METHODS AND SYSTEMS FOR CONCRETE MATERIALS AND CONCRETE MIXTURE CHARACTERIZATION

(71) Applicant: AICrete Corp., Richmond, CA (US)

(72) Inventors: Parham Aghdasi, Richmond, CA (US); Han-Ting Cheng, San Francisco, CA (US)

(73) Assignee: AICrete Corp., Richmond, CA (US)

( * ) Notice: Subject to any disclaimer, the term of this patent is extended or adjusted under 35 U.S.C. 154(b) by 0 days.

(21) Appl. No.: 18/938,118

(22) Filed: Nov. 5, 2024

(65) Prior Publication Data
US 2025/0061385 A1    Feb. 20, 2025

Related U.S. Application Data

(63) Continuation of application No. PCT/US2024/021229, filed on Mar. 22, 2024.
(Continued)

(51) Int. Cl.
*G06N 20/20* (2019.01)
*G01N 33/38* (2006.01)
(Continued)

(52) U.S. Cl.
CPC ............. *G06N 20/20* (2019.01); *G06N 3/044* (2023.01); *G06N 3/045* (2023.01); *G06N 3/08* (2013.01);
(Continued)

(58) Field of Classification Search
CPC ........ G06N 20/00; G06N 20/10; G06N 20/20; G06N 3/02; G06N 3/04; G06N 3/0464;
(Continued)

(56) References Cited

U.S. PATENT DOCUMENTS

2011/0080577 A1    4/2011    Nelson et al.
2014/0241104 A1*   8/2014    Phares ............... C04B 40/0032
                                                      366/6
(Continued)

FOREIGN PATENT DOCUMENTS

EP    3924906 B1    8/2023
ES    2937411 A1    3/2023
(Continued)

OTHER PUBLICATIONS

Co-pending U.S. Appl. No. 17/528,184, inventor Parham; Aghdasi, filed Nov. 16, 2021.
(Continued)

*Primary Examiner* — Shane D Woolwine
(74) *Attorney, Agent, or Firm* — Wilson Sonsini Goodrich & Rosati

(57) ABSTRACT

Systems, methods, and computer-readable media of characterizing concrete materials or concrete mixtures may include: obtaining, using sensors that comprise at least two different types of sensors, sensor data corresponding to the concrete materials or the concrete mixtures; analyzing, using a trained machine learning model, the sensor data to generate the characterization of the concrete materials or the concrete mixture; and outputting the characterization of the concrete materials or the concrete mixture. Training the trained machine learning model may include: obtaining a set of training data for historical concrete materials or a historical concrete mixture, including a plurality of characterizations of the historical concrete materials or the historical concrete mixture; classifying the set of training data into a plurality of subsets each corresponding to a different characterization or range of characterizations of the plurality of characterizations; and generating the trained machine learning model using the plurality of subsets of training data.

27 Claims, 34 Drawing Sheets

Related U.S. Application Data

(60) Provisional application No. 63/454,571, filed on Mar. 24, 2023.

(51) Int. Cl.

| | |
|---|---|
| *G06N 3/02* | (2006.01) |
| *G06N 3/04* | (2023.01) |
| *G06N 3/044* | (2023.01) |
| *G06N 3/045* | (2023.01) |
| *G06N 3/0464* | (2023.01) |
| *G06N 3/08* | (2023.01) |
| *G06N 3/088* | (2023.01) |
| *G06N 3/09* | (2023.01) |
| *G06N 5/01* | (2023.01) |
| *G06N 20/00* | (2019.01) |
| *G06N 20/10* | (2019.01) |
| *H04W 4/38* | (2018.01) |

(52) U.S. Cl.
CPC .............. *G06N 3/088* (2013.01); *G06N 5/01* (2023.01); *G06N 20/00* (2019.01); *G06N 20/10* (2019.01); *G01N 33/383* (2013.01); *G06N 3/02* (2013.01); *G06N 3/04* (2013.01); *G06N 3/0464* (2023.01); *G06N 3/09* (2023.01); *H04W 4/38* (2018.02)

(58) Field of Classification Search
CPC .......... G06N 3/09; G06N 3/044; G06N 3/045; G06N 3/08; G06N 3/088; G06N 5/01; G01N 33/383; H04W 4/38
See application file for complete search history.

(56) References Cited

U.S. PATENT DOCUMENTS

| | | | |
|---|---|---|---|
| 2017/0284996 A1* | 10/2017 | Ghods | C04B 40/0096 |
| 2019/0301109 A1 | 10/2019 | Roberts | |
| 2020/0245930 A1* | 8/2020 | Cohen | A61B 5/4878 |
| 2021/0063336 A1* | 3/2021 | Ghods | G06N 20/00 |
| 2022/0107251 A1 | 4/2022 | Ghods et al. | |
| 2022/0234249 A1* | 7/2022 | Papania-Davis | G16C 20/20 |
| 2022/0253734 A1 | 8/2022 | Aghdasi et al. | |
| 2023/0090743 A1 | 3/2023 | Pinto et al. | |
| 2023/0264156 A1 | 8/2023 | Pereira | |
| 2023/0367295 A1* | 11/2023 | Jayaprakash | B05B 12/084 |
| 2024/0096072 A1* | 3/2024 | He | G06V 10/774 |

FOREIGN PATENT DOCUMENTS

| | | |
|---|---|---|
| JP | 2008008753 A | 1/2008 |
| JP | 2023065743 A | 5/2023 |
| WO | WO-2024206184 A1 | 10/2024 |

OTHER PUBLICATIONS

PCT/US2024/021229 International Search Report and Written Opinion dated Jul. 3, 2024.

Layssi, Hamed. et al. Electrical resistivity of concrete. Concrete International 37(5):41-46 (2015).

U.S. Appl. No. 17/578,886 Office Action dated Jun. 9, 2025.

* cited by examiner

METHODS AND SYSTEMS FOR CONCRETE MATERIALS AND CONCRETE MIXTURE CHARACTERIZATION

CROSS-REFERENCE

This application is a continuation of International Application No. PCT/US2024/021229, filed Mar. 22, 2024, which claims the benefit of U.S. Provisional Patent Application No. 63/454,571, filed Mar. 24, 2023, the contents of each of which is incorporated herein by reference in their entirety.

BACKGROUND

Concrete is the most ubiquitous construction material and the second most used substance in the world after water. Further, concrete has been one of the most important inventions which has enabled the molding of our environment to desired forms. It has been in use for thousands of years creating roads, buildings, coliseums, skyscrapers, bridges, tunnels, etc. However, the manufacturing process of concrete has changed little over the years and produced enormous amounts of greenhouse gas, particularly in one of concrete's ingredients, cement. In fact, production of cement alone accounts for about 8% of global $CO_2$ emissions.

Concrete may be comprised of coarse aggregate (e.g., rocks), fine aggregate (e.g., sand), water, and cement. Cement may react with water to "glue" together the coarse aggregate and the fine aggregate. Cement may also be the most expensive and most environmentally unfriendly of the four ingredients. Underlying this high usage of cement may be uncertainties regarding the basic qualities of the coarse aggregate and the fine aggregate being used. Accordingly, higher amounts of cement may be used in a concrete mixture as a form of insurance, at the peril of both the environment and efficiency (e.g., with respect to time, cost, resources, communications, etc.) for the industry.

SUMMARY

Systems, methods, computer-readable media, and techniques disclosed herein may use computer vision to monitor various parameters of concrete materials and mixtures. For example, the systems, the methods, the computer-readable media, and the techniques disclosed herein may monitor parameters of concrete materials such as coarse aggregates (e.g., rock) and fine aggregates (e.g., sand) used during aggregate and concrete production. The parameters of concrete materials monitored may include aggregate moisture, specific gravity, particle size distribution, packing density, shape, surface qualities, cleanliness, flakiness, clay content, or other physical and chemical properties. In another example, the systems, the methods, the computer-readable media, and the techniques disclosed herein may monitor parameters of concrete mixtures such as a mixture of cement, water, and aggregates. The parameters of concrete mixtures monitored may include slump (e.g., a measure of the flowability and workability of the concrete mixture), air content, actual water-to-cementitious materials ratio, or other physical and chemical properties.

In some cases, the systems, the methods, the computer-readable media, and the techniques disclosed herein may be used with conveyor belts or aggregate bins that are used for moving, storing, and measuring the weights of aggregate materials. In some cases, the systems, the methods, the computer-readable media, and the techniques disclosed herein may be used with wet concrete mixers (e.g., at concrete plants) or concrete truck mixers (e.g., during transit). In the case of concrete production, the systems, the methods, the computer-readable media, and the techniques may be used before the aggregate materials reach load cells for weight measurement adjustments, e.g., based on the different properties of the aggregates. Accordingly, the systems, the methods, the computer-readable media, and the techniques disclosed herein may enable real-time adjustment of fine and coarse aggregates as well as water in the concrete mixture.

One aspect of the present disclosure provides a method for characterizing concrete materials or concrete mixtures, including: (A) obtaining, at one or more processors, using a plurality of sensors that comprise at least two different types of sensors, sensor data corresponding to the concrete materials or the concrete mixtures; (B) analyzing, via the one or more processors using a trained machine learning model, the sensor data to generate the characterization of the concrete materials or the concrete mixture; and (C) outputting, via the one or more processors, the characterization of the concrete materials or the concrete mixture.

Another aspect of the present disclosure provides a method for training a statistical model to characterize concrete materials or a concrete mixture, including: (A) obtaining, by one or more processors, a set of training data for historical concrete materials or a historical concrete mixture, including a plurality of characterizations of the historical concrete materials or the historical concrete mixture; (B) classifying, by the one or more processors, the set of training data into a plurality of subsets each corresponding to a different characterization or range of characterizations of the plurality of characterizations; and (C) generating, by the one or more processors, the statistical model for characterizing concrete materials or concrete mixtures using the plurality of subsets of training data.

Another aspect of the present disclosure provides a system comprising one or more computer processors and computer memory coupled thereto. The computer memory comprises machine executable code that, upon execution by the one or more computer processors, implements any of the method(s) above or elsewhere herein.

Another aspect of the present disclosure provides a non-transitory computer-readable media comprising machine-executable code comprising one or more instructions that, upon execution, implements any of the method(s) above or elsewhere herein on a computer, wherein said computer is configured to execute said one or more instructions.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

DETAILED DESCRIPTION

While various embodiments of the invention have been shown and disclosed herein, it will be obvious to those skilled in the art that such embodiments are provided by way of example. Numerous variations, changes, and substitutions may occur to those skilled in the art without departing from the present disclosure. It should be understood that various alternatives to the embodiments of the present disclosure may be employed.

There may be significant benefit presented by the systems, the methods, the computer-readable media, and the techniques disclosed herein with accurately monitoring qualities of the basic materials in concrete production, thereby replacing wasteful practices. The systems, the methods, the computer-readable media, and the techniques disclosed herein may leverage the improvements in machine learning and computer vision to accurately monitor processes and ingredients during concrete production.

Advantageously, the systems, the methods, the computer-readable media, and the techniques disclosed herein may improve efficiency of concrete production, such as with respect to material usage, environmental impact, wired and wireless communications, labor, and cost. For example, using the systems, the methods, the computer-readable media, and the techniques disclosed herein, cost in concrete production may be reduced by up to 10% (which may be significant, considering the concrete industry often may have only about 2-5% profit margins). In another example, using the systems, the methods, the computer-readable media, and the techniques disclosed herein, greenhouse gas emissions may be reduced by 35% or more in the production of concrete. In another example, using the systems, the methods, the computer-readable media, and the techniques disclosed herein, concrete production processes may be streamlined, reducing the challenges associated with production, thereby reducing network traffic between those involved in concrete production. In another example, using the systems, the methods, the computer-readable media, and the techniques disclosed herein, concrete production processes may create less waste as, e.g., trial and error is reduced or eliminated in the concrete production processes.

Examples of System Diagrams

Figure 1:
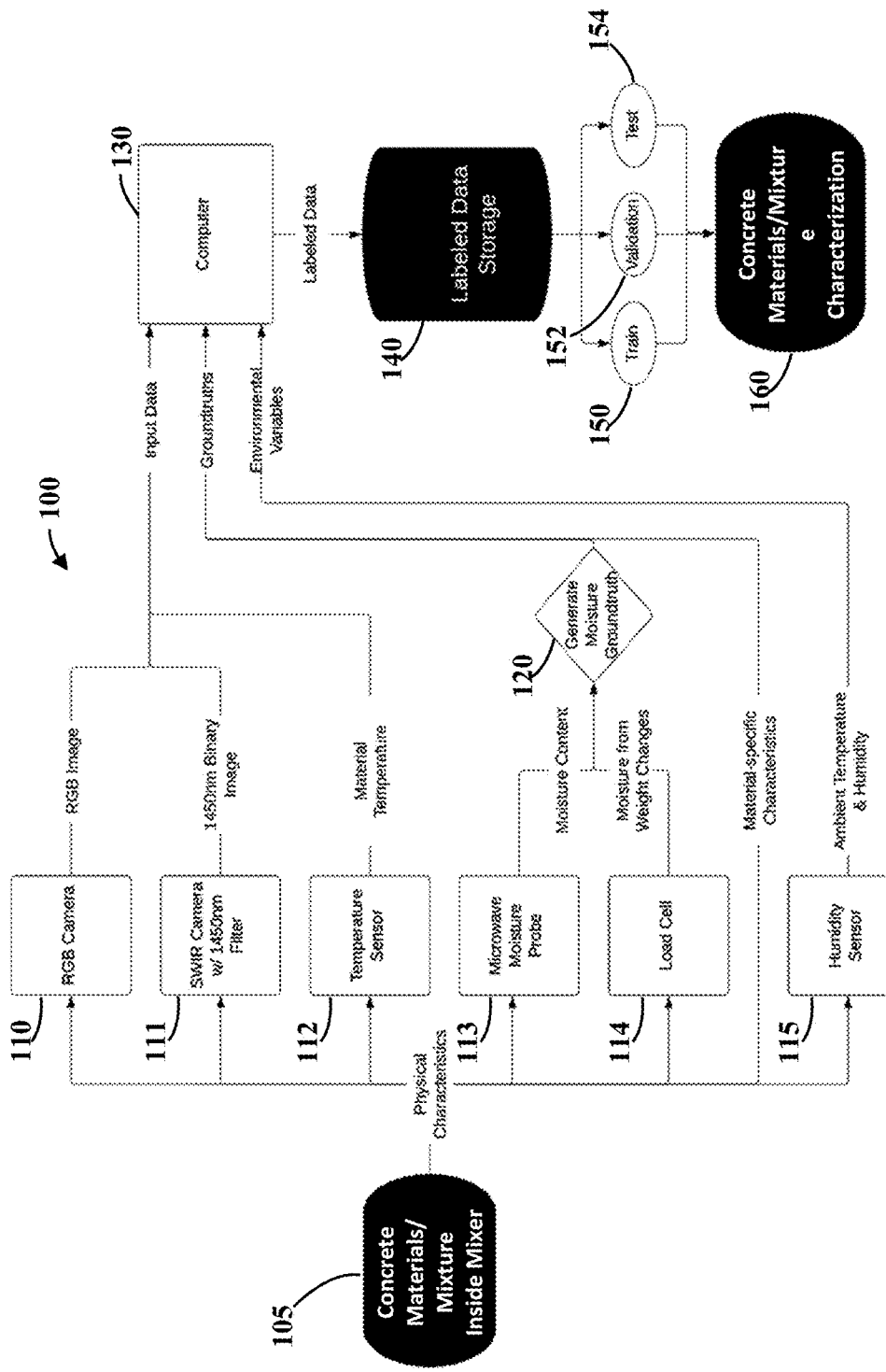
FIG. 1 illustrates an example system diagram for characterizing concrete materials or a concrete mixture, consistent with certain examples of the present disclosure.

FIG. 1 illustrates an example system diagram 100 for characterizing concrete materials or a concrete mixture, consistent with certain examples of the present disclosure. The diagram 100 includes a computer 130 that is communicatively coupled with sensors 110-115 that collect data from a mixer 105. The sensors 110-115 include a red, green, blue (RGB) camera 110, a short-wave infrared imaging (SWIR) camera 111, a temperature sensor 112, a microwave moisture probe 113, a load cell 114, and a humidity sensor 115. Data obtained at the computer 130 from the sensors may be stored in a labeled data storage 140 and used to generate a training dataset 150, a validation dataset 152, and a testing dataset 154, the three of which may be used with a ML model for characterizing concrete materials or a concrete mixture at 160.

The mixer at 105 may be any suitable mixer or other apparatus used for mixing or producing concrete (or inputs to concrete, e.g., aggregates). While the mixer 105 may include devices used for mixing or producing concrete, such as devices in which the basic ingredients of concrete are added and the concrete is actually mixed, the mixer 105 may, in some cases, also include concrete agitation devices whose function is to purely agitate a concrete mix prepared in a stationary plant mixer. Further, in some cases, the mixer 105 may include a stationary plant mixer for mixing concrete. In some cases, the mixer 105 may be a standalone unit. For example, the mixer 105 may be a device whose primary function is to mix, produce, agitate, etc. concrete. In some cases, the mixer 105 may be integrated into another device. For example, the mixer 105 may be integrated into a delivery truck or mixing truck.

The sensors 110-115 may collect (e.g., measure, obtain, receive, etc.) data from the mixer 105 (including from the concrete materials or the concrete mixture within the mixer 105). The sensors 110-115 may collect data relating to various qualities of concrete materials or a concrete mixture. For example, the sensors may collect image data, video data, audio data, temperature data, humidity data, moisture data, pressure data, acceleration data, velocity data, mass data, density data, viscosity data, color data, light data, electric data, flow data, proximity data, etc.

The RGB camera 110 may collect visible light (e.g., about 400 nanometers (nm) to about 700 nm)) and convert the visible light to an electrical signal that is organized to render images or videos. The RGB camera 110 may be pointed at the mixer 105 or the concrete materials or the concrete mixture in the mixer 105. Image or video data from the RGB camera 110 may be, in some cases filtered using a filter. The filter may include one or more of: spatial filters, frequency filters, linear filters, non-linear filters, mean filters, dilation filters, erosion filters, Gaussian filters, derivative filters, low-pass filters, high-pass filters, bandpass filters, smoothing filters, median filters, bilateral filters, convolutional filters, morphological filters, gradient filters, blurring filters, sharpening filters, emboss filters, identity filters, or other suitable filters. The RGB camera 110 may collect image data or video data about the concrete materials or the concrete mixture in the mixer 105. For example, the RGB camera 110 may be used in measuring particle size distribution, shape, surface qualities, cleanliness, etc. of the concrete materials or the concrete mixture. As illustrated, the RGB camera 110 may output an RGB image (e.g., of the concrete materials or the concrete mixture) to the computer 130 as input data.

The SWIR camera 111 may collect infrared (IR) light. Specifically, in some cases, the SWIR camera 111 may collect shortwave IR light. The SWIR camera 111 may collect light between wavelengths of about 900 nm to about 3,000 nm. In some cases, the light may be between about 900 nm to about 1,100 nm, about 900 nm to about 1,400 nm, about 900 nm to about 2,500 nm, about 900 nm to about 3,000 nm, about 1,100 nm to about 1,400 nm, about 1,100 nm to about 2,500 nm, about 1,100 nm to about 3,000 nm, about 1,400 nm to about 2,500 nm, about 1,400 nm to about 3,000 nm, or about 2,500 nm to about 3,000 nm. In some cases, the light may be between about 900 nm, about 1,100 nm, about 1,400 nm, about 2,500 nm, or about 3,000 nm. In some cases, the light may be between at least about 900 nm, about 1,100 nm, about 1,400 nm, or about 2,500 nm. In some cases, the light may be between at most about 1,100 nm, about 1,400 nm, about 2,500 nm, or about 3,000 nm. The SWIR camera 111 may the shortwave IR light to an electrical signal that is organized to render images or videos. Advantageously, the SWIR camera 111 may be able to penetrate opaque materials non-invasively, distinguish between regions that are chromatically similar, penetrate haze, create a natural scene contrast, etc. The SWIR camera 111 may be pointed at the mixer 105 or the concrete materials or the concrete mixture in the mixer 105. Image or video data from the SWIR camera 111 may be, in some cases, filtered using a filter. The filter may include one or more of: spatial filters, frequency filters, linear filters, non-linear filters, mean filters, dilation filters, erosion filters, Gaussian filters, derivative filters, low-pass filters, high-pass filters, bandpass filters, smoothing filters, median filters, bilateral filters, convolutional filters, morphological filters, gradient filters, blurring filters, sharpening filters, emboss filters, identity filters, or other suitable filters. The SWIR camera 111 may collect image data or video data about the concrete materials or the concrete mixture in the mixer 105. For example, the SWIR camera 111 may be used in measuring particle size distribution, shape, surface qualities, cleanliness, etc. of the concrete materials or the concrete mixture. As illustrated, the SWIR camera 111 may output a binary image (e.g., of the concrete materials or the concrete mixture) to the computer 130 as input data. In some cases, the binary image may be at about 1450 nm (e.g., +10 nm). The binary image may be spectral data, coinciding with the water absorption wavelength of light.

The temperature sensor 112 may collect temperature data. The temperature sensor 112 may include one or more types of suitable temperature sensors, such as thermocouples, change-of-state sensors, resistive temperature measuring devices, IR sensors, bimetallic sensors, thermometers, silicon diodes, thermistors (e.g., negative temperature coefficient (NTC) thermistors) semi-conductor-based sensors, etc. The temperature sensor 112 may collect temperature data about the concrete materials or the concrete mixture in the mixer 105. For example, the temperature sensor 112 may be used in measuring the temperature of the concrete materials or the concrete mixture. In another example, the temperature sensor 112 may be used in measuring the moisture in the concrete materials or the concrete mixture. As illustrated, the temperature sensor 112 may output material temperature (e.g., of the concrete materials or the concrete mixture) to the computer 130 as input data.

The microwave moisture probe 113 may collect moisture data. The microwave moisture probe 113 may include one or more types of suitable moisture sensors. For example, the microwave moisture probe 113 may measure moisture content based at least in part on microwaves interacting with water molecules, where water has a higher dielectric constant compared to most other materials. Therefore, when microwaves interact with water molecules within the concrete materials or the concrete mixture, the microwaves may slow down (and hence change phase) and weaken (e.g., attenuate) as energy is transferred to the water. The microwave moisture probe 113 may collect temperature data about the concrete materials or the concrete mixture in the mixer 105. For example, the microwave moisture probe 113 may be used in measuring the moisture content of the concrete materials or the concrete mixture. Output from the microwave moisture probe 113 may be used in generating a ground truth moisture content for the concrete materials or the concrete mixture. The ground truth moisture content may be provided to the computer 130 as input data.

The load cells 114 may collect moisture data. The load cells 114 may include one or more types of suitable load cells (e.g., force transducers). For example, the load cells 114 may a force (e.g., tension, compression, pressure, or torque) into an electrical signal that can be measured and standardized, whereas the force applied to the load cell increases, the electrical signal changes proportionally. The load cells 114 may load data about the concrete materials or the concrete mixture in the mixer 105. For example, the load cells 114 may be used in measuring the moisture content of the concrete materials or the concrete mixture. In some cases, the load cells 114 may measure weight changes (e.g., of the concrete materials or the concrete mixture, of the overall mixer, etc.) as water evaporates from the concrete materials or the concrete mixture. In some cases, the load cells 114 may include only one load cell. In some cases, the load cells 114 may include a plurality of load cells. For example, the load cells 114 may include two load cells, three load cells, four load cells, five load cells, six load cells, seven load cells, eight load cells, nine load cells, ten load cells, etc. Similarly, as with the moisture probe 113, output from the load cells 114 may be used in generating the ground truth moisture content for the concrete materials or the concrete mixture. For example, the moisture content measured by the microwave moisture probe 113 and the moisture content measured by the load cells 114 may be jointly considered (e.g., averaged) to generate the final ground truth label for the moisture content of the concrete materials or the concrete mixture at 120. In some cases, the moisture ground truth generated at 120 may be considered along with material-specific characteristics to form a plurality of ground truths. In some cases, the final ground truth label for other parameters (e.g., particle size, distribution, shape, texture, etc.) may be input directly (such as by a user, using, e.g., graduation testing). The final ground truth labels from the microwave moisture probe 113 and the load cells 114, which are used to generate the moisture ground truth at 120, may be input to the computer 130 as ground truths, as illustrated.

The humidity sensor 115 may collect ambient humidity data or temperature data near or around the concrete materials or the concrete mixture or the mixer 105. The humidity sensor 115 may convert the humidity data or temperature data to an electrical signal. The humidity sensor 115 may be a capacitive, resistive, or thermal sensor. Ambient temperature data and humidity data may be collected by the humidity sensor 115 to observe their influence on the resulting data (e.g., the input data that is input to the computer system 130). The temperature data and the humidity data collected by the humidity sensor 115 may be provided to the computer 130 as environmental variables.

As illustrated, the sensors 110-115 may provide the data collected from the mixer 105 to the computer 130. Specifically, as illustrated and described, data from the RGB camera 110, the SWIR camera 111, and the temperature sensor 112 may all be input to the computer 130 as the input data; data from the microwave moisture probe 113 and the load cells 114 may be input to the computer 130 as ground truths; and data from the humidity sensor 115 may be input to the computer as environmental variables.

The computer 130 may include one or more processors, a memory, or a storage that communicate with each other, and with other components, via a bus. The bus may also link a display, one or more input devices (which may, for example, include a keypad, a keyboard, a mouse, a stylus, etc.), one or more output devices, one or more storage devices, and various tangible storage media. All of these elements may interface directly or via one or more interfaces or adaptors to the bus. For instance, the various tangible storage media can interface with the bus via storage medium interface. The computer 130 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers. The computer 130 may include one or more processor(s) (e.g., central processing units (CPUs), general purpose graphics processing units (GPGPUs), or quantum processing units (QPUs) that carry out functions. The processor(s) optionally may include a cache memory unit for temporary local storage of instructions, data, or computer addresses. The processor(s) of the computer 130 may be configured to assist in execution of computer readable instructions. The computer 130 may provide functionality for the components depicted in FIG. 1 as a result of the processor(s) executing non-transitory, processor-executable instructions embodied in one or more tangible computer-readable storage media, such as memory, storage, storage devices, or storage medium.

The computer-readable media of the computer 130 may store software that implements particular operations, and the processor(s) may execute the software. The memory of the computer 130 may read the software from one or more other computer-readable media (such as mass storage device(s) or from one or more other sources through a suitable interface, such as a network interface. The software may cause the processor(s) of the computer 130 to carry out one or more processes or one or more operations of one or more processes described or illustrated herein. Carrying out such processes or operations may include defining data structures stored in the memory of the computer 130 and modifying the data structures as directed by the software. In accordance with the description herein, suitable computing devices for the computer 130 may include, by way of non-limiting examples, server computers, server farms, desktop computers, laptop computers, notebook computers, sub-notebook computers, netbook computers, netpad computers, set-top computers, media streaming devices, handheld computers, Internet appliances, mobile smartphones, tablet computers, personal digital assistants, video game consoles, or vehicles. Select televisions, video players, or digital music players with optional computer network connectivity may be suitable for use in the system described herein. Suitable tablet computers, in various cases, include those with booklet, slate, and convertible configurations. In some cases, a computer program may run on the computer 130 that includes a mobile application provided to a mobile computing device. In some cases, the mobile application is provided to a mobile computing device at the time it is manufactured. In other cases, the mobile application is provided to a mobile computing device via the computer network described herein. In view of the disclosure provided herein, the computer program running on the computer 130 may be created using hardware, languages, and development environments such as, C, C++, C#, Objective-C, Java™, JavaScript, Pascal, Object Pascal, Python™, Ruby, VB.NET, WML, or XHTML/HTML with or without CSS, or combinations thereof.

All the collected data from the sensors 110-115 may be processed with the computer 130 to store them as labeled datasets. In some cases, the computer 130 may send and receive data from the labeled data storage 140. For example, the computer 130 may send the labeled datasets that are generated by the computer 130 based at least in part on the input data, the ground truths, or the environmental variables provided by the sensors 110-115 to the labeled data storage 140. In some cases, various databases may be suitable for the labeled data storage 140. The labeled data in the labeled data storage 140 may be one or more of historical, present, or future data or information. In some cases, suitable databases for the labeled data storage 140 may include relational databases, non-relational databases, object-oriented databases, object databases, entity-relationship model databases, associative databases, XML databases, document-oriented databases, and graph databases. Further examples for the labeled data storage 140 may include SQL, PostgreSQL, MySQL, Oracle, DB2, Sybase, or MongoDB. In some cases, the labeled data storage 140 includes a database that is Internet-based. In some cases, the labeled data storage 140 includes a database that is web-based. In some further cases, the labeled data storage 140 include a database that is cloud computing-based. In some cases, the labeled data storage 140 includes a database that is a distributed database. In some cases, the labeled data storage 140 includes a database is based on one or more local computer storage devices.

The labeled datasets of the labeled data storage 140 may be split into the training dataset 150, the validation dataset 152, and the test dataset 154 for use with a deep learning model for characterization of rock and sand.

The training dataset 150 may be used to train a ML model. The ML model may implement one or more ML techniques described in the "Example Machine Learning Techniques" section. For example, in some cases, the ML model may be a deep learning model. In some cases, the ML model may use a convolutional neural network. In some cases, the ML model may use vision transformers. In some cases, the ML model may use masked autoencoders. In some cases, the ML model may use Long Short-Term Memory networks. In some cases, the ML model may use random forests. In some cases, the ML model may use support vector machines.

Training the ML model using the training dataset 150 may include, in some cases, selecting one or more untrained data models to train using a training data set. The selected untrained data models may be specified to generate an output (e.g., a prediction) based upon the training dataset 150 as input. Conditions for training the ML model from the selected untrained data models may likewise be selected, such as limits on the ML model complexity or limits on the ML model refinement past a certain point. The ML model may be trained (e.g., via the computer 130) using the training data set 150. The ML model may be trained with the training dataset 150 using appropriate ML techniques, based upon the type of ML model selected and any conditions specified for training the ML model. Such training may continue, in some cases, until at least one aspect of the ML model is validated and meets selection criteria to be used as a predictive model.

The validation dataset 152 may be used to validate the ML model trained using the training dataset 150. Such validation may include applying the ML model to the validation dataset 152 to make predictions derived from the validation dataset 152. The ML model may then be evaluated to determine whether performance is sufficient based upon the derived predictions. Evaluating the ML model may include, in some cases, comparing output predictions from the ML model generated using the validation dataset 152 with the ground truths input to the computer 130. The sufficiency criteria applied to the ML model may vary depending upon the size of the training dataset 150 available for training, the performance of previous iterations of trained models, or user-specified performance requirements. If the ML model does not achieve sufficient performance, additional training using the training dataset 150 may be performed. When the ML model has achieved sufficient performance, in some cases, the ML model may be stored for present or future use. The ML model may be stored as sets of parameter values or weights for analysis of further input (e.g., further relevant parameters to use as further predicted variables, further explanatory variables, further user interaction data, etc.), which may also include analysis logic or indications of model validity in some instances. In some cases, a plurality of ML models may be stored for generating predictions under different sets of input data conditions. In some embodiments, the ML model may be stored in a database (e.g., associated with a server).

The test dataset 154 may be analyzed by the ML model to output predictions. For example, the ML model may output a characterization of concrete materials or a concrete mixture (e.g., with respect to coarse and fine aggregates). For example, the ML model may, using the test dataset 154, perform automated characterization of the concrete materials or the concrete mixture at 160.

The concrete materials or the concrete mixture may be characterized using the ML model at 160. The parameters of concrete materials characterized may include aggregate moisture, specific gravity, particle size distribution, packing density, shape, surface qualities, cleanliness, flakiness, clay content, or other physical and chemical properties. The parameters of concrete mixtures characterized may include slump, air content, actual water-to-cementitious materials ratio, or other physical and chemical properties.

For characterizing the concrete materials, a technique may include: (A) achieving the highest free moisture content possible by taking a sample of fine or coarse aggregates (e.g., between 50 to 75 pounds) and adding additional water; (B) determining initial free moisture content of the sample via an oven test; (C) providing the sample to a mixer, where the sample is mixed slowly (e.g., over a few days) until the sample naturally reaches a negative free moisture content (e.g., below saturated surface dry condition), and where various sensors (e.g., one or more of the sensors 110-115) collect a first round data of the sample as the sample is mixed; (D) labeling the first round of data (e.g., images) collected while the mixer mixed the sample; (E) removing the sample and drying the sample (e.g., completely drying) in an oven; (F) after drying the sample in the oven, providing the sample to the mixer again, where the various sensors collect a second round of data of the sample; (G) determining particle size distribution of the sample after removing the sample from the mixer and performing gradation testing; (H) labeling the second round of data based at least in part on the determined particle size distribution; (I) dividing the sample into a plurality of sub-samples of known sizes after passing the sample through a plurality of sieves (e.g., 1", ¾", ½", ⅜", #4, #8, #16, #30, #50, #100, #200, and pan); (J) providing each sub-sample of the plurality of sub-samples to the mixer, where the various sensors collect a third round of data for each of the sub-samples; (K) labeling the third round of data (e.g., images) collected while the mixer mixed each of the plurality of sub-samples, thereby enabling training of a machine learning model to predict different particle sizes.

Turning to characterizing the concrete mixture, slump may be characterized or predicted in inches, millimeters, etc. as a measure of flowability and workability of concrete, such as, the consistency of fresh concrete before it sets where the higher the slump, the more fluid the concrete. Actual water-to-cementitious materials ratio may range from about 0.35 to 0.65 and may be the ratio of water to cementitious materials (e.g., pozzolans such as fly ash and silica fume in addition to the hydraulic cements-portland cement and ground slag), which may indicate the compressive strength, abrasion resistance, and permeability of the concrete mixture. Air content may be about 1% to about 10% in a concrete mixture and may be an indication of the strength of the concrete mixture as a higher strength concrete may have a lower air content. Though, in some cases, air may affect the strength of concrete and is important for strength prediction, in other cases, air-entraining agents may be introduced in a concrete mixture to intentionally increase the air content of a concrete mixture. For example, air content of a concrete mixture may be increased to avoid cracking of concrete due to freezing of moisture and water in cold climates as when water freezes in concrete due to low temperatures, it expands and, if there are no air voids in concrete for it to expand within, the freezing water can cause internal damage and cracking of concrete. To avoid this cracking phenomenon in cold climate, the systems, the methods, the computer-readable media, and the techniques disclosed herein may be adapted to consider air entrainment for concrete mixtures. In general, slump, air content, actual water-to-cementitious materials ratio are three very important characteristics of the concrete mixture. To generate labeled images for this purpose, the system of FIG. 1 may be used to collect data (e.g., via one or more of the sensors 110-115). But instead of inputting rock and sand to the mixer (as done when characterizing the concrete materials), the concrete mixture may be provided to the mixer for data collection and will be labeling the collected images by conducting slump and air tests.

Figure 2:
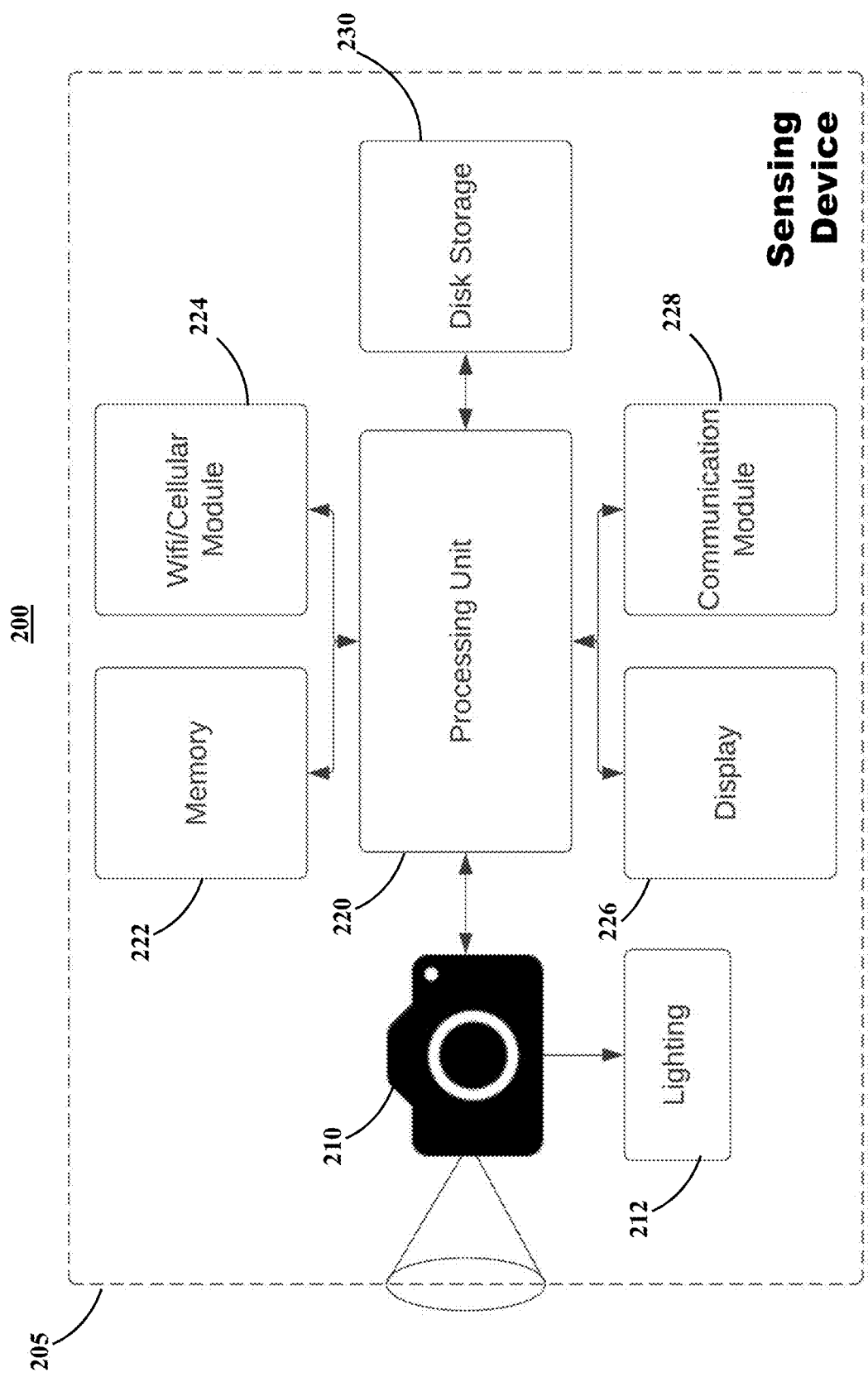
FIG. 2 illustrates another example system diagram for characterizing concrete materials or a concrete mixture, consistent with certain examples of the present disclosure.

FIG. 2 illustrates another example system diagram 200 for characterizing concrete materials or a concrete mixture, consistent with certain examples of the present disclosure. The diagram 200 includes a sensing device 205. The sensing device 205 may be positioned in proximity to one or more concrete materials or a concrete mixture. In some cases, multiple instances of the sensing device 205 may be positioned in proximity to one or more concrete materials or a concrete mixture (e.g., with each instance in a different location). At a high level, the sensing device 205 may include a camera 210, a processing unit 220, and a communication unit module 228.

In some cases, the camera 210 may be the same as or similar to one or both of the RGB camera 110 or the SWIR camera 111 of FIG. 1. In some cases, the camera 210 may include a plurality of cameras (e.g., a plurality of cameras of one or more types, a plurality of cameras with different fields of view, etc.). In some cases, lighting 212 may aid the camera 210 in capturing effective images. For example, the lighting 212 may emit visible light, infrared light, ultraviolet light, etc. In some cases, the lighting 212 may be a fixed lighting source. In other cases, the lighting 212 may turn on in conjunction with the camera 210 capturing an image (serving as a "flash").

In some cases, the processing unit 220 may be the same as or similar to the computer 130 of FIG. 1. For example, the processing unit may be configured to perform one or more machine learning operations. This may include performing machine learning algorithms (e.g., computer vision algorithms) for analyzing one or more images of the concrete materials or the concrete mixture and generating one or more insights based at least in part on this analysis. In some cases, the processing unit 220 may perform at least some operations that may be the same as or similar to the automated characterization of the concrete materials or the concrete mixture at 160 of FIG. 1.

In some cases, the processing unit may include a communication module 228 that may be configured to send or receive data from the sensing device 205. In some cases, the communication module may function in cooperation with a Wi-Fi/cellular module 224. In some cases, the sent or received data may include image data, video data, temperature data, moisture data, humidity data, load data, performance data, efficiency data, etc. In some cases, the sent or received data may be sent or received to or from one or more databases. In some cases, the sent or received data may include training data for a machine learning model or validation data for a machine learning model. In some cases, the sent or received data may include one or more machine learning models. In some cases, the sent or received data may include a characterization of concrete materials or a concrete mixture, or other outputs of a machine learning model. In some cases, a display 226 may display one or more of the sent or received data. In some cases, a memory 222 or a disk storage 230 may store one or more of the sent or received data.

Figure 3:
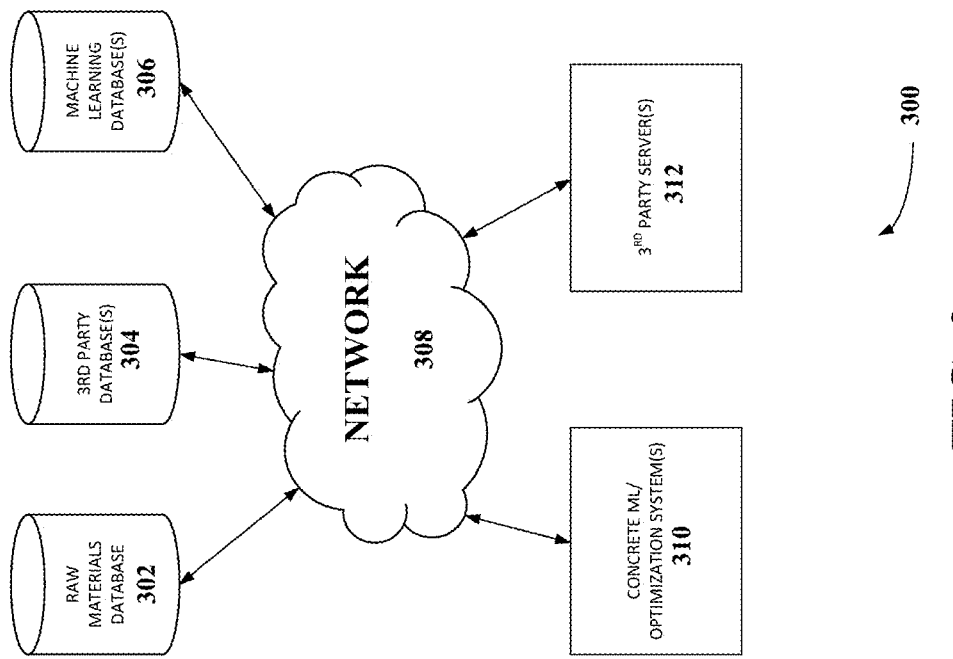
FIG. 3 illustrates an example environment for characterizing concrete materials or a concrete mixture, consistent with certain examples of the present disclosure.

Examples of Environments for Characterizing Concrete Materials or a Concrete Mixture FIG. 3 illustrates an example environment 300 for characterizing concrete materials or a concrete mixture, consistent with certain examples of the present disclosure.

Concrete ML/optimization system(s) 310 can include various machine-learning engines (which, for example, may be the same as or similar to those stored in the sensing device 205 of FIG. 2). Concrete ML/optimization system(s) 310 can utilize machine learning algorithms optimize concrete/cement formulae in a specified context of an application site. Machine learning can be used to study and construct algorithms that can learn from and make predictions on data. These algorithms can work by making data-driven predictions or decisions, through building a mathematical model from input data. The data used to build the final model usually comes from multiple datasets. In particular, three datasets may be used in different stages of the creation of the model. The model may be initially fit on a training dataset (e.g., the training dataset 150 of FIG. 1), which may be a set of examples used to fit the parameters (e.g., weights of connections between neurons in artificial neural networks) of the model. The model (e.g., an artificial neural net or a naive Bayes classifier) may be trained on the training dataset using a supervised learning method (e.g., gradient descent or stochastic gradient descent). In practice, the training dataset often includes pairs of an input vector (or scalar) and the corresponding output vector (or scalar), which may be denoted as the target (or label). The current model may be run with the training dataset and to produce a result, which is then compared with the target, for each input vector in the training dataset. Based on the result of the comparison and the specific learning algorithm being used, the parameters of the model may be adjusted. The model fitting may include both variable selection and parameter estimation. Successively, the fitted model may be used to predict the responses for the observations in a second dataset called the validation dataset. The validation dataset may provide an unbiased evaluation of a model fit on the training dataset while tuning the model's hyperparameters (e.g., the number of hidden units in an artificial neural network). Validation datasets can be used for regularization by early stopping: stop training when the error on the validation dataset increases, as this is a sign of overfitting to the training dataset. This procedure may be complicated in practice by fluctuation in the validation dataset's error during training, producing multiple local minima. This complication has led to the creation of many ad-hoc rules for deciding when overfitting has truly begun. Finally, the test dataset may be a dataset used to provide an unbiased evaluation of a final model fit on the training dataset. If the data in the test dataset has never been used in training (e.g., in cross-validation), the test dataset is also called a holdout dataset.

More specifically, concrete ML/optimization system(s) 310 can use proprietary datasets supplemented by partner data, as well as cutting edge AI tools. These can include model-based reinforcement learning, Bayesian optimization, model-based multi-armed bandits, convolutional neural networks, generative adversarial networks and other cutting-edge machine learning algorithms to predict the properties of millions of combinations of raw materials as well as organic and chemical admixtures and supplementary cementitious materials used in cement and concrete production, and producing and testing material structures and properties using robotic systems to quickly converge on optimal mixes or to discover new cements or concrete materials. This enables drastic improvements in cost and performance characteristics for each project.

In one example, concrete ML/optimization system(s) 310 provides service to two types of companies. Concrete ML/optimization system(s) 310 provides services to aggregate (e.g., sand, rock, etc.) producers, cement companies, concrete companies, aggregate producers, etc. It is noted that these can be a single or a plurality of entities.

In some cases, concrete ML/optimization system(s) 310 use customer data (e.g., 3rd party database(s) 304 obtained via 3rd party server(s) 312, etc.) augmented by example proprietary datasets (e.g., raw materials database 302, machine learning database(s) 306, etc.) as well as its ML/AI tools, to provide real-time feedback to cement, aggregate, or concrete production plants with the purpose of optimizing concrete production, efficiency, and quality control in order to avoid undesirable concrete properties before and after being used in the final concrete product.

It is noted that ML/optimization system(s) 410 can utilize a data-driven approach. ML/optimization system(s) 310 can manage proprietary data and a fully-automated robotic laboratory. ML/optimization system(s) 310 can collect large amounts of data (e.g., big data) for training, development, and testing its machine learning models. Finally, ML/optimization system(s) 310 can use machine learning models backed by big data, generated through its fully-automated lab, to invent and discover new cements, concretes, and other construction materials to either license to other producers or to mass produce itself.

Examples of Systems for Characterizing Concrete Materials or a Concrete Mixture

Figure 4A:
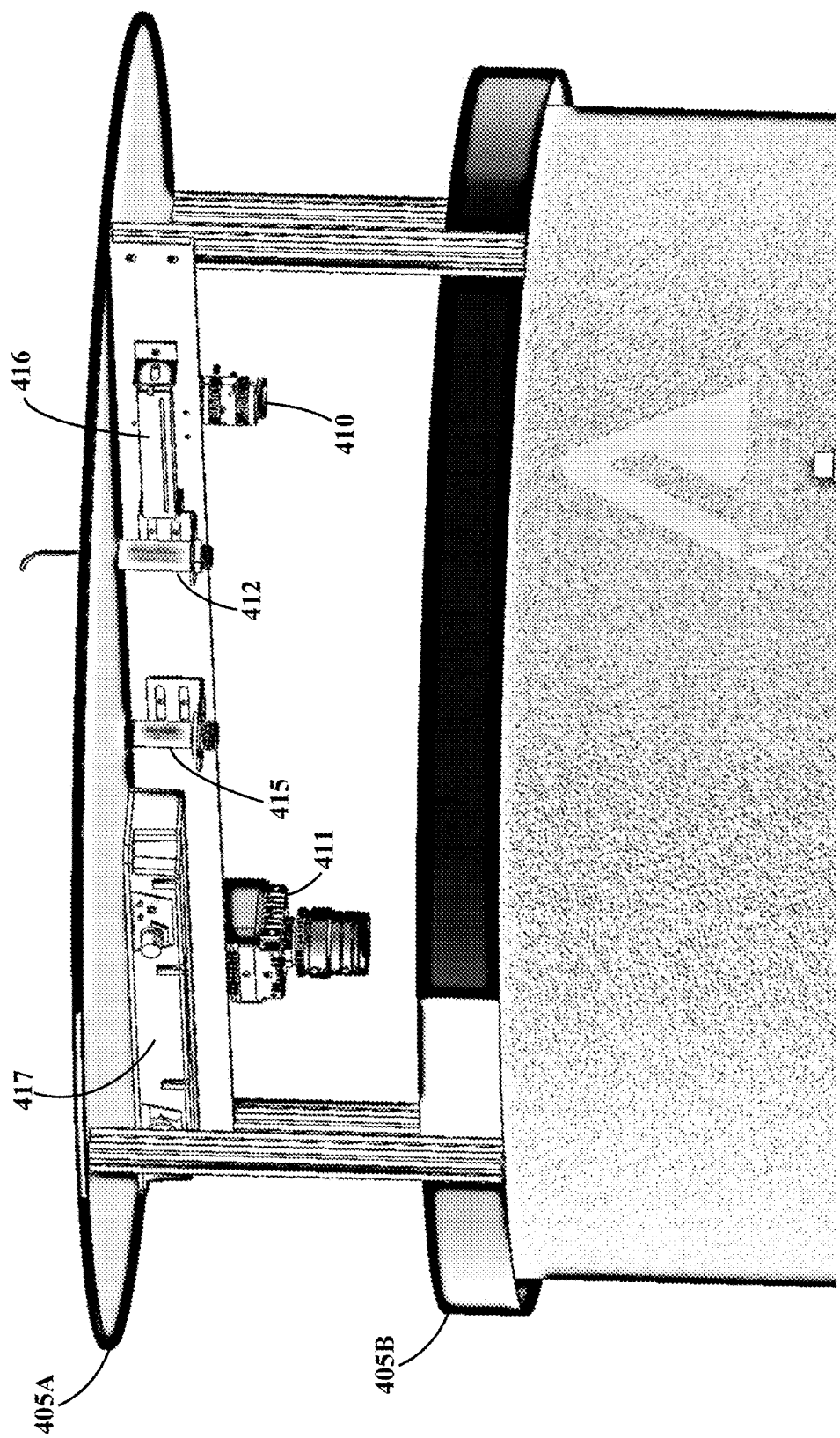
FIG. 4A illustrates an upper front-left perspective of an example system in a closed configuration for characterizing concrete materials or a concrete mixture implemented in a mixer, consistent with certain examples of the present disclosure.
Figure 4B:
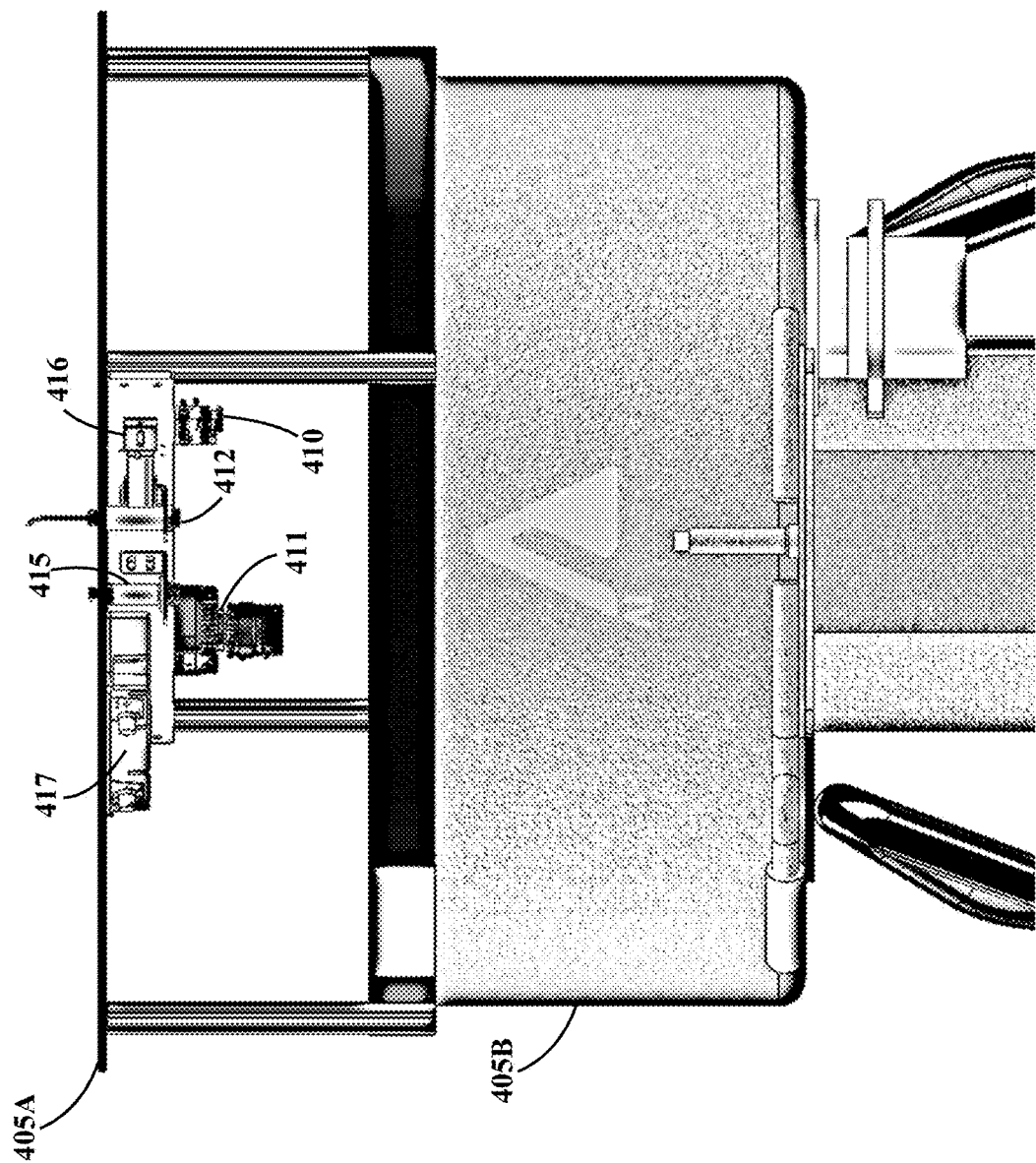
FIG. 4B illustrates an upper front view of an example system in a closed configuration for characterizing concrete materials or a concrete mixture implemented in a mixer, consistent with certain examples of the present disclosure.
Figure 4C:
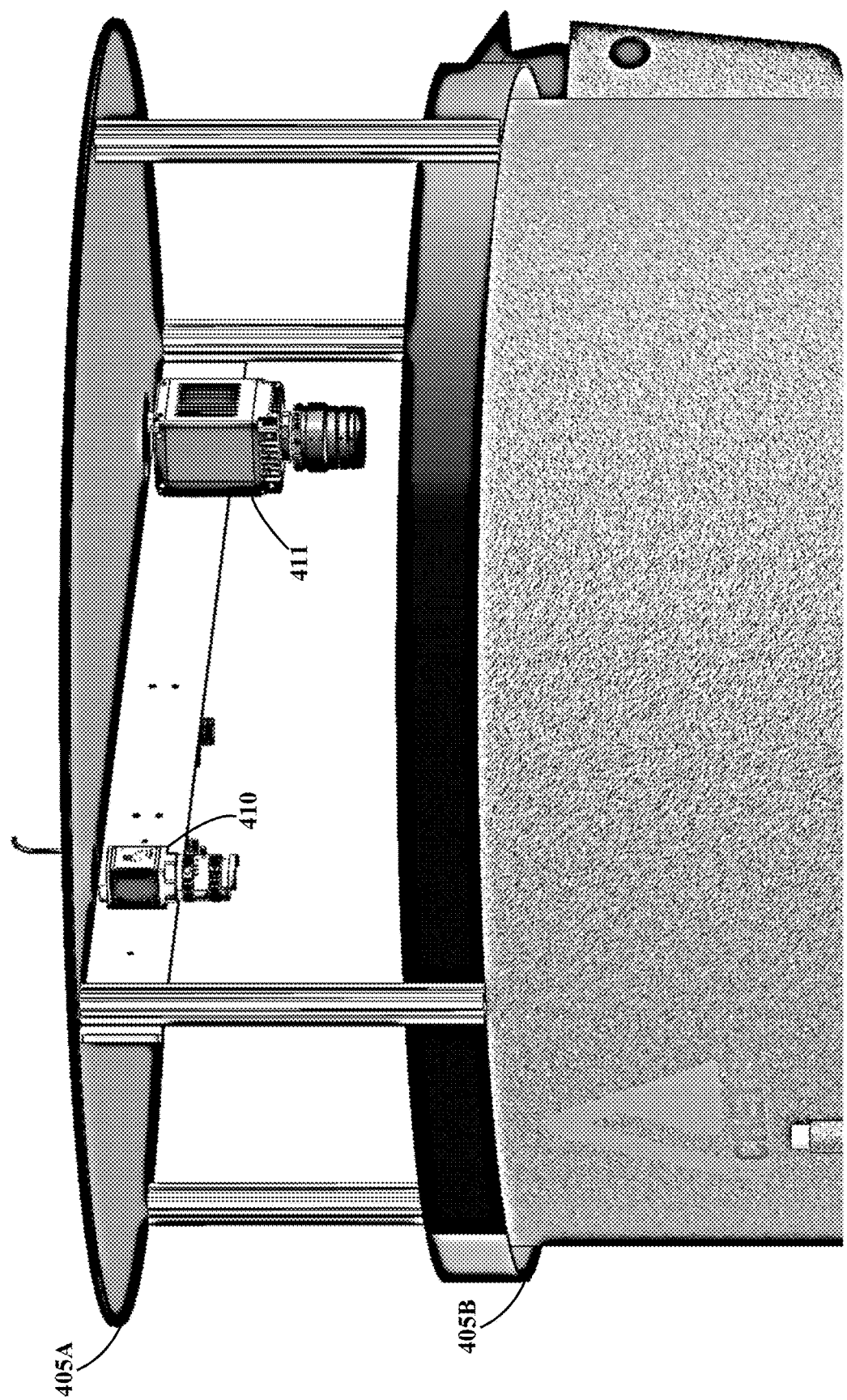
FIG. 4C illustrates an upper rear-right perspective of an example system in a closed configuration for characterizing concrete materials or a concrete mixture implemented in a mixer, consistent with certain examples of the present disclosure.
Figure 4D:
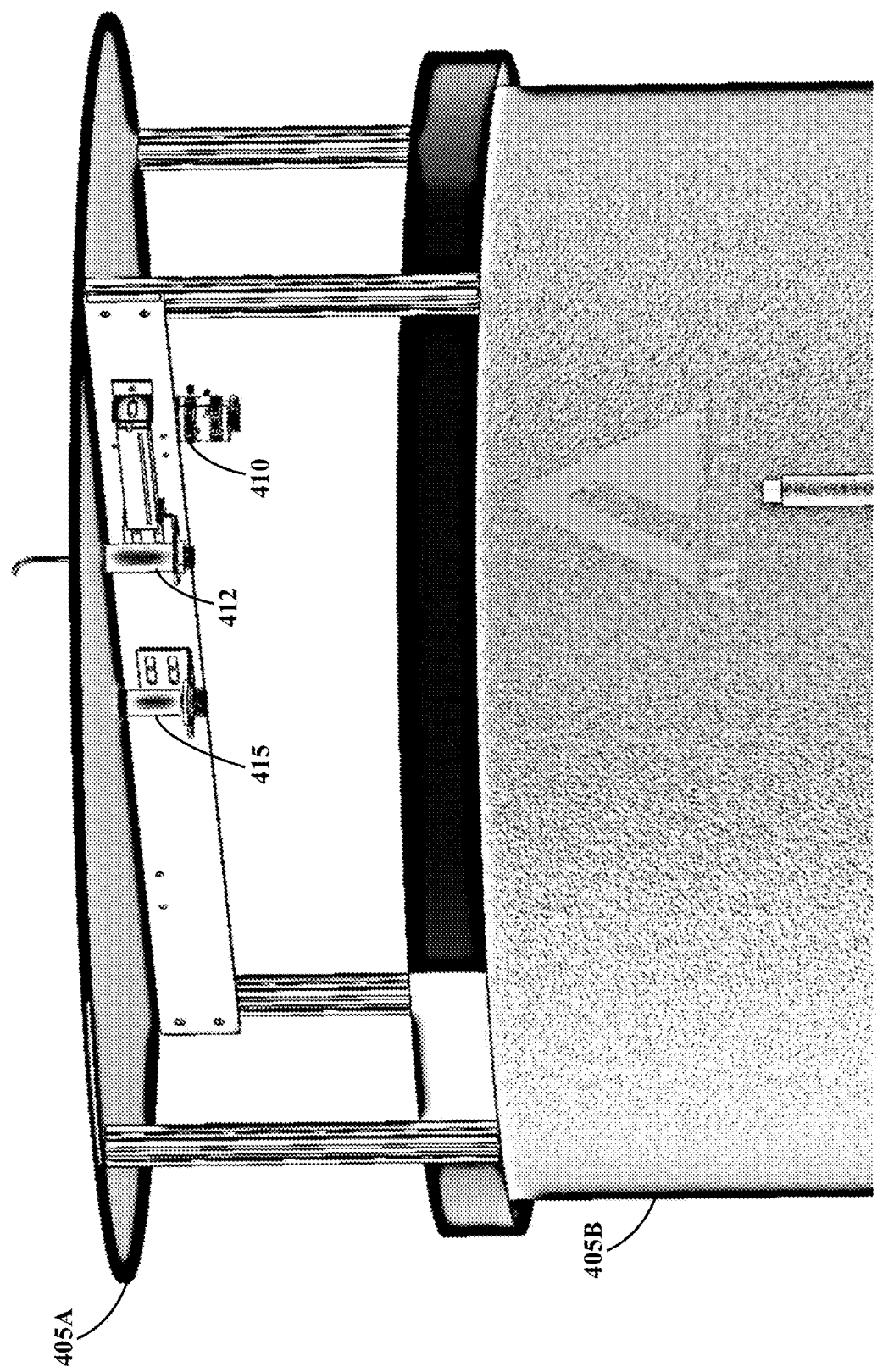
FIG. 4D illustrates another upper front-left perspective of an example system in a closed configuration for characterizing concrete materials or a concrete mixture implemented in a mixer, consistent with certain examples of the present disclosure.
Figure 4E:
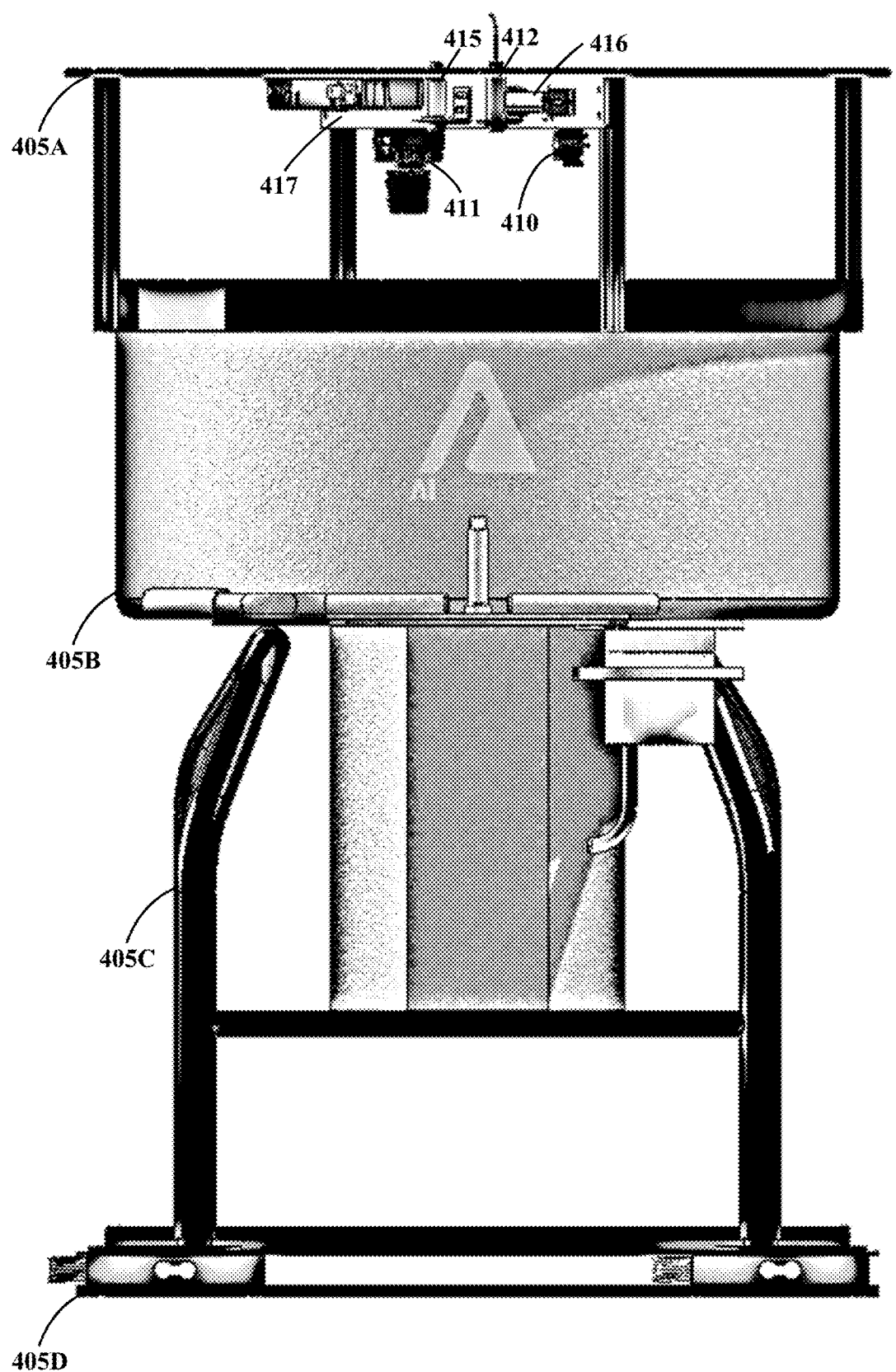
FIG. 4E illustrates a front view of an example system in a closed configuration for characterizing concrete materials or a concrete mixture implemented in a mixer, consistent with certain examples of the present disclosure.
Figure 4F:
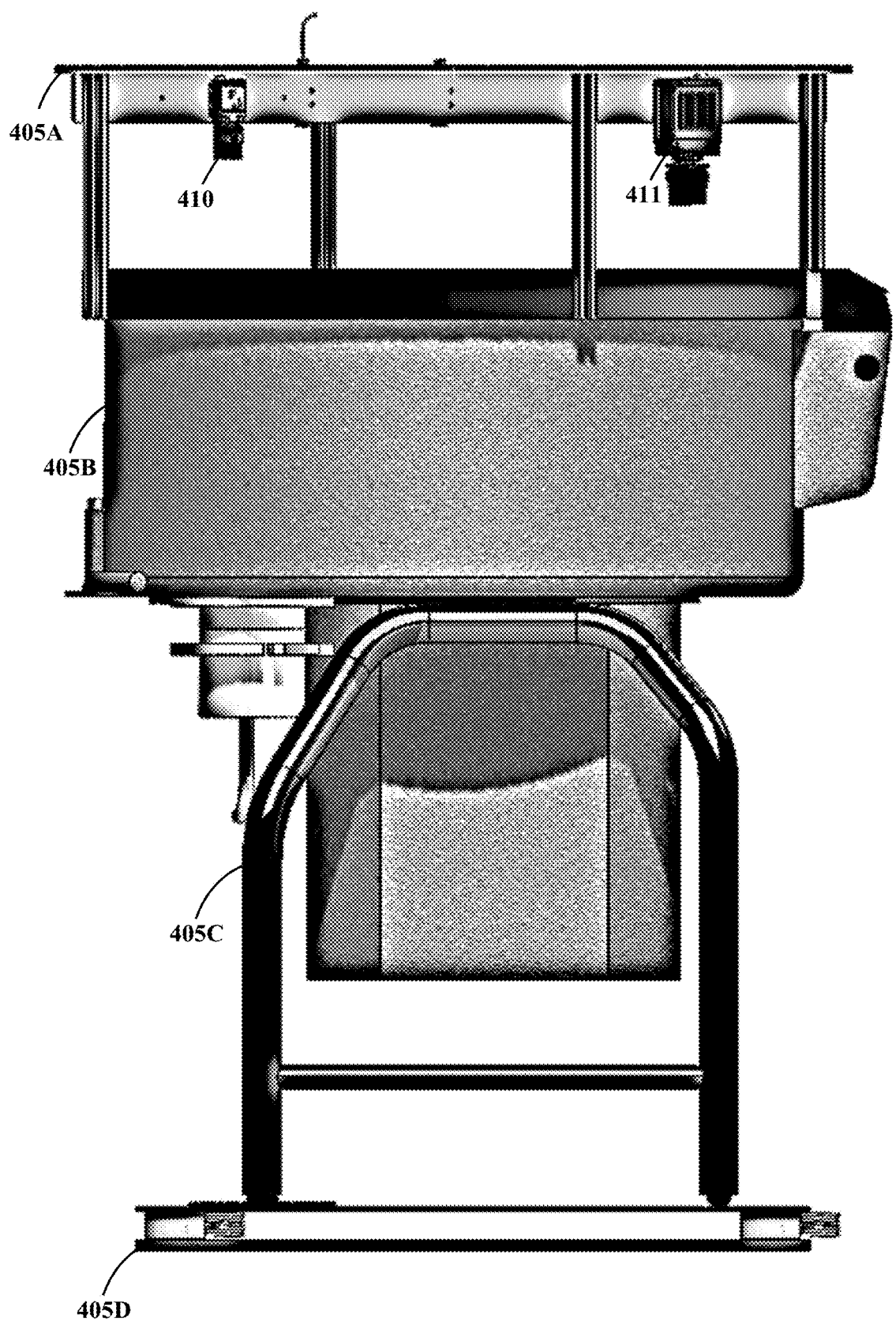
FIG. 4F illustrates a rear view of an example system in a closed configuration for characterizing concrete materials or a concrete mixture implemented in a mixer, consistent with certain examples of the present disclosure.
Figure 4G:
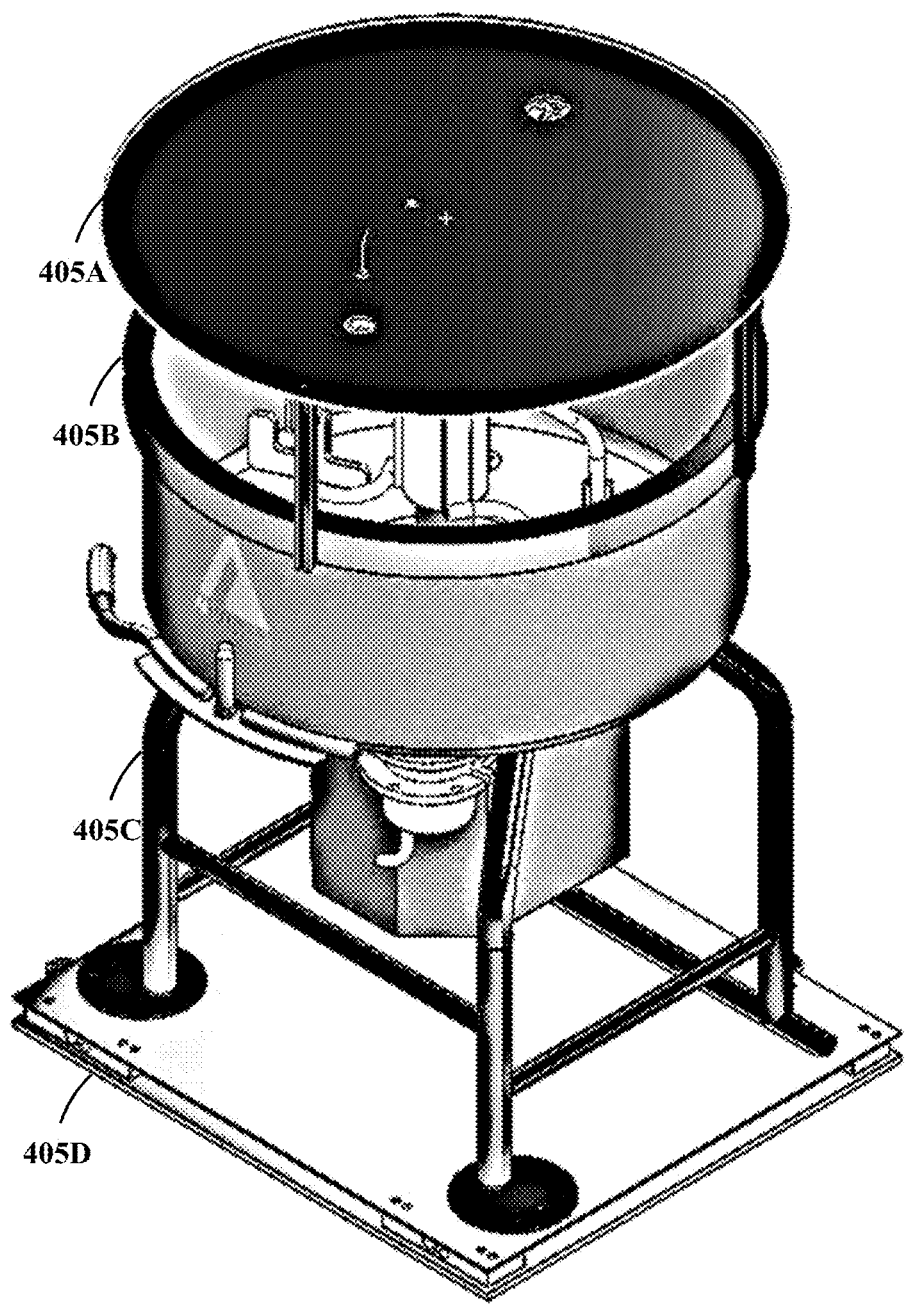
FIG. 4G illustrates a front-right topside perspective of an example system in a closed configuration for characterizing concrete materials or a concrete mixture implemented in a mixer, consistent with certain examples of the present disclosure.
Figure 4H:
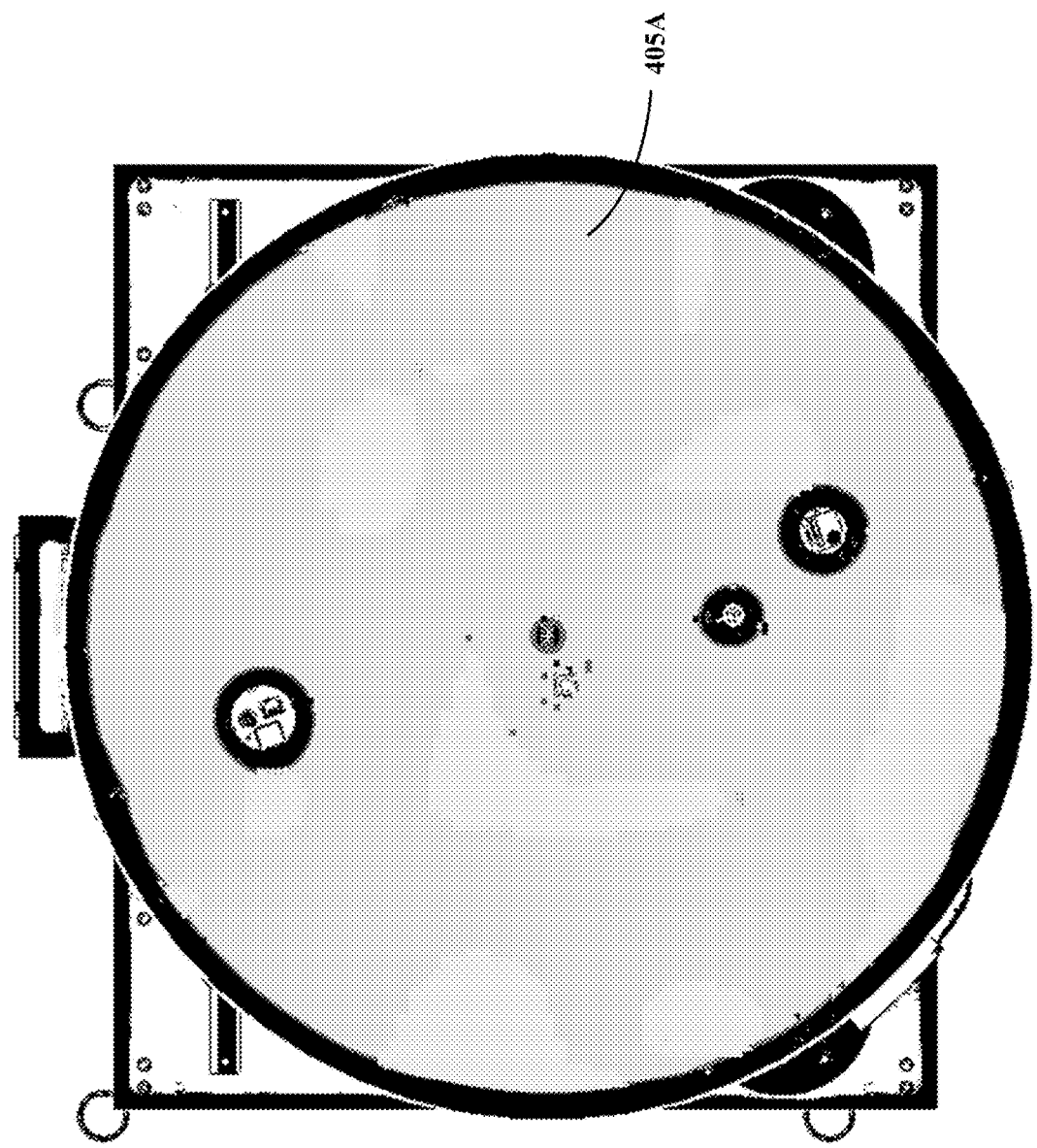
FIG. 4H illustrates a topside view of an example system in a closed configuration for characterizing concrete materials or a concrete mixture implemented in a mixer, consistent with certain examples of the present disclosure.
Figure 4I:
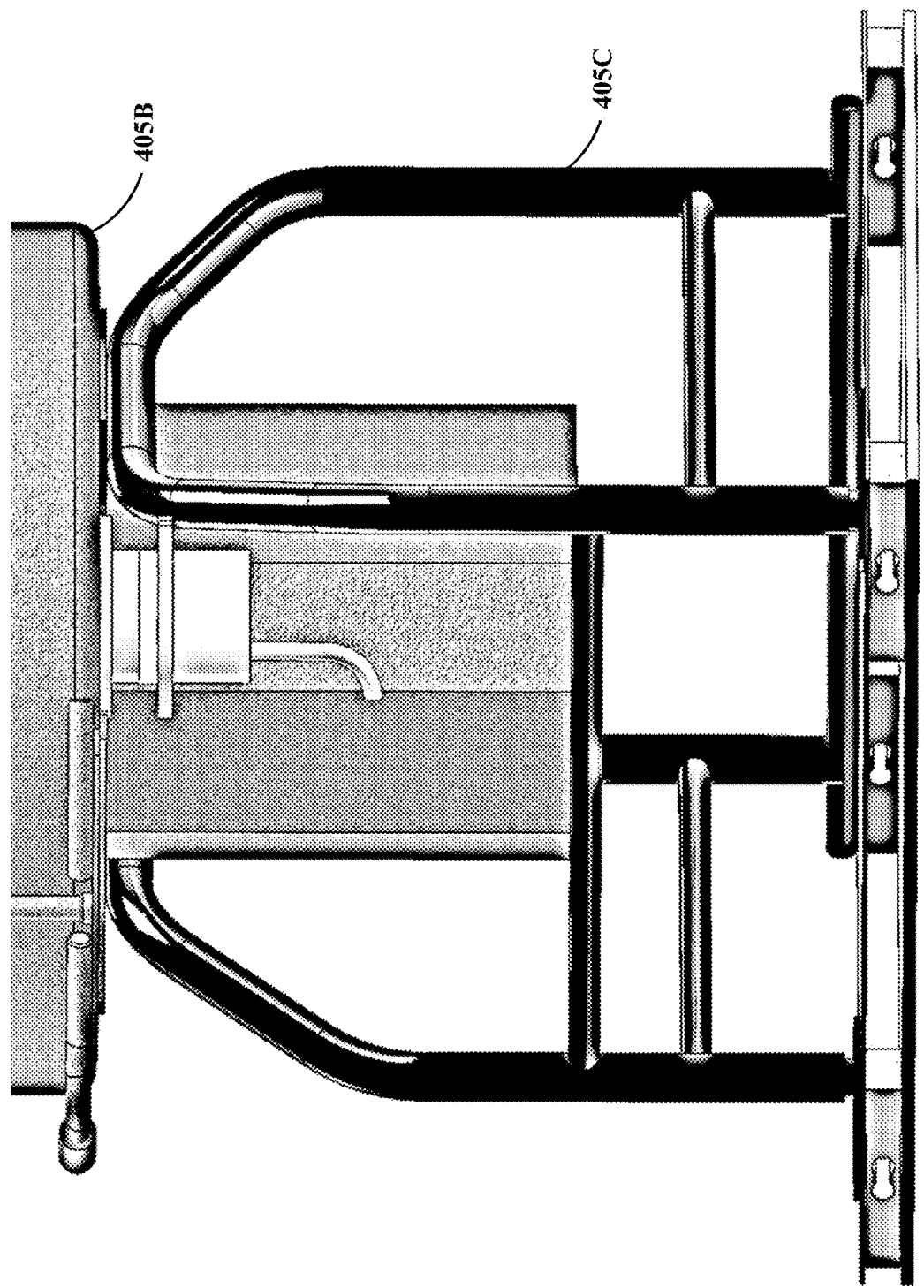
FIG. 4I illustrates a lower front perspective of an example system for characterizing concrete materials or a concrete mixture implemented in a mixer, consistent with certain examples of the present disclosure.
Figure 4J:
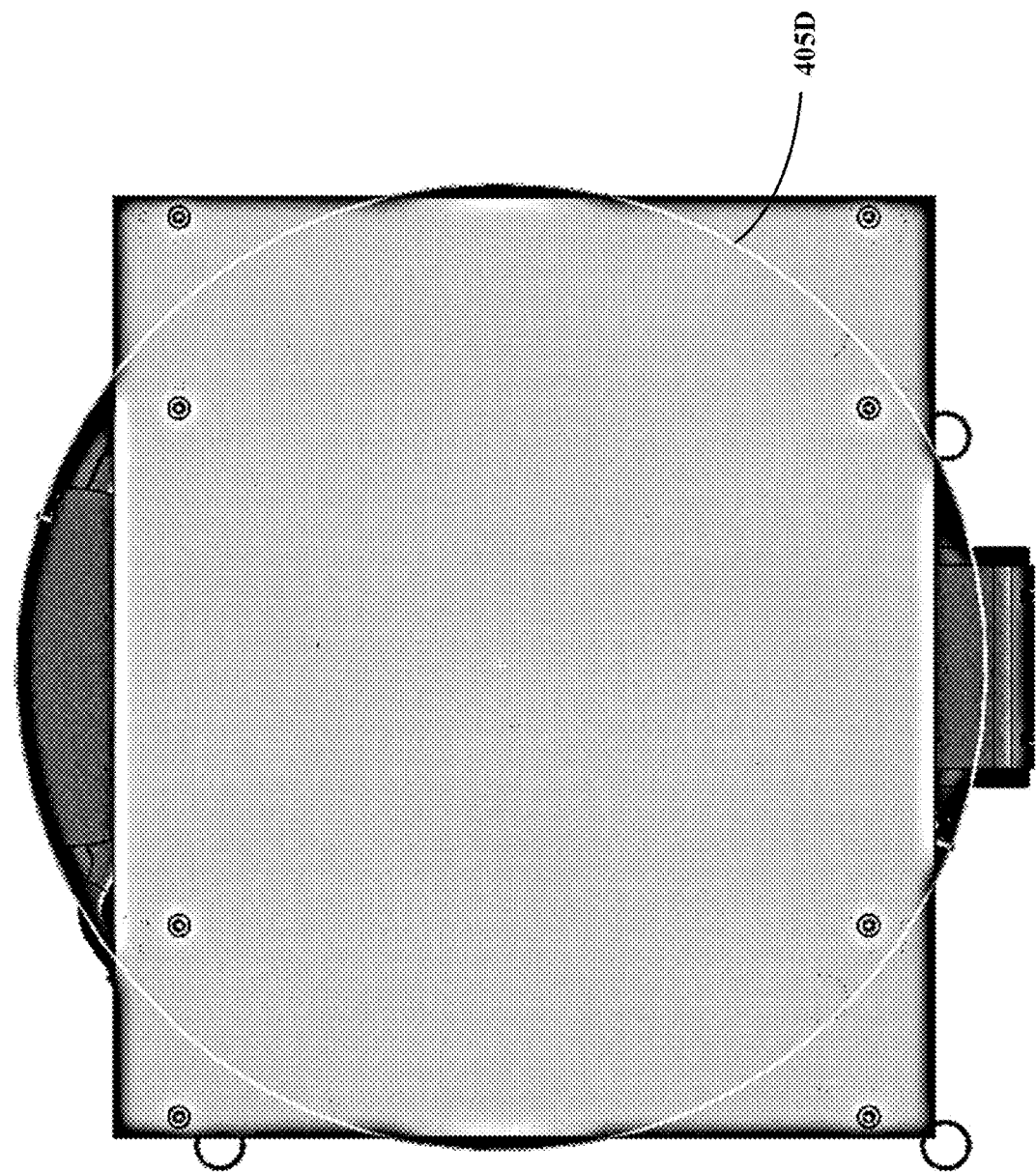
FIG. 4J illustrates an underside view of an example system for characterizing concrete materials or a concrete mixture implemented in a mixer, consistent with certain examples of the present disclosure.
Figure 4K:
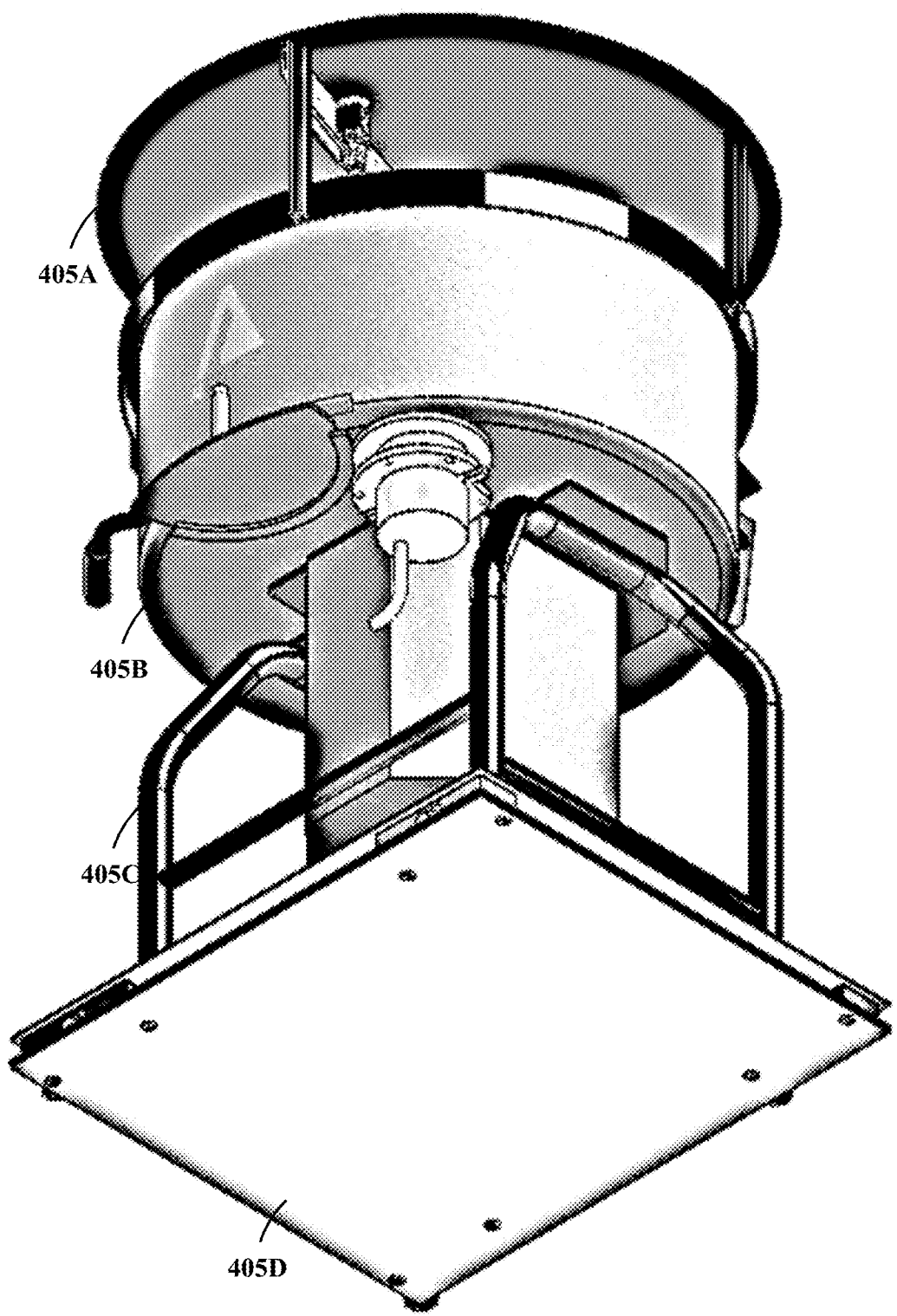
FIG. 4K illustrates a front-right underside perspective of an example system in a closed configuration for characterizing concrete materials or a concrete mixture implemented in a mixer, consistent with certain examples of the present disclosure.
Figure 4L:
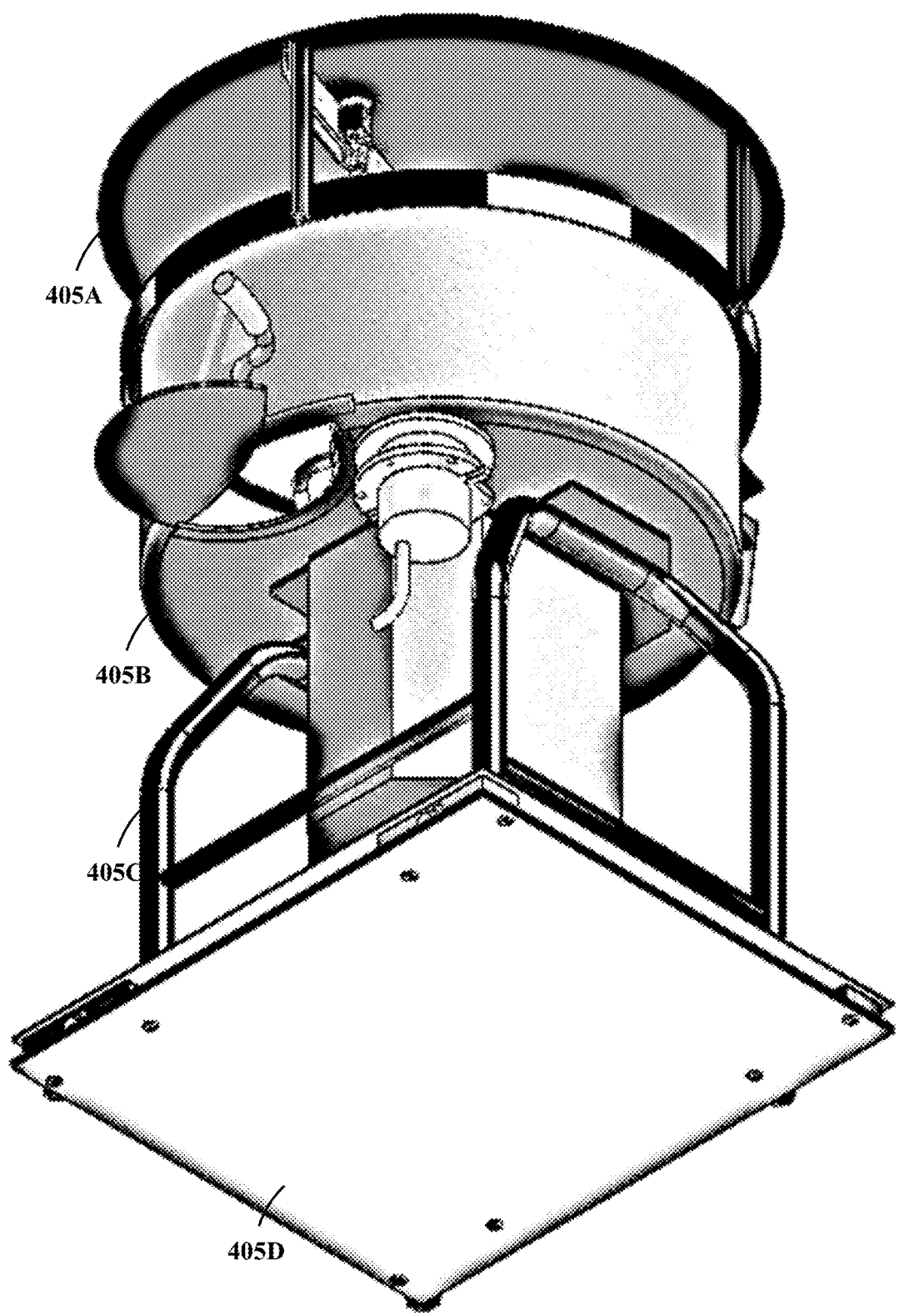
FIG. 4L illustrates another front-right underside perspective of an example system in a closed configuration for characterizing concrete materials or a concrete mixture implemented in a mixer, consistent with certain examples of the present disclosure.
Figure 4M:
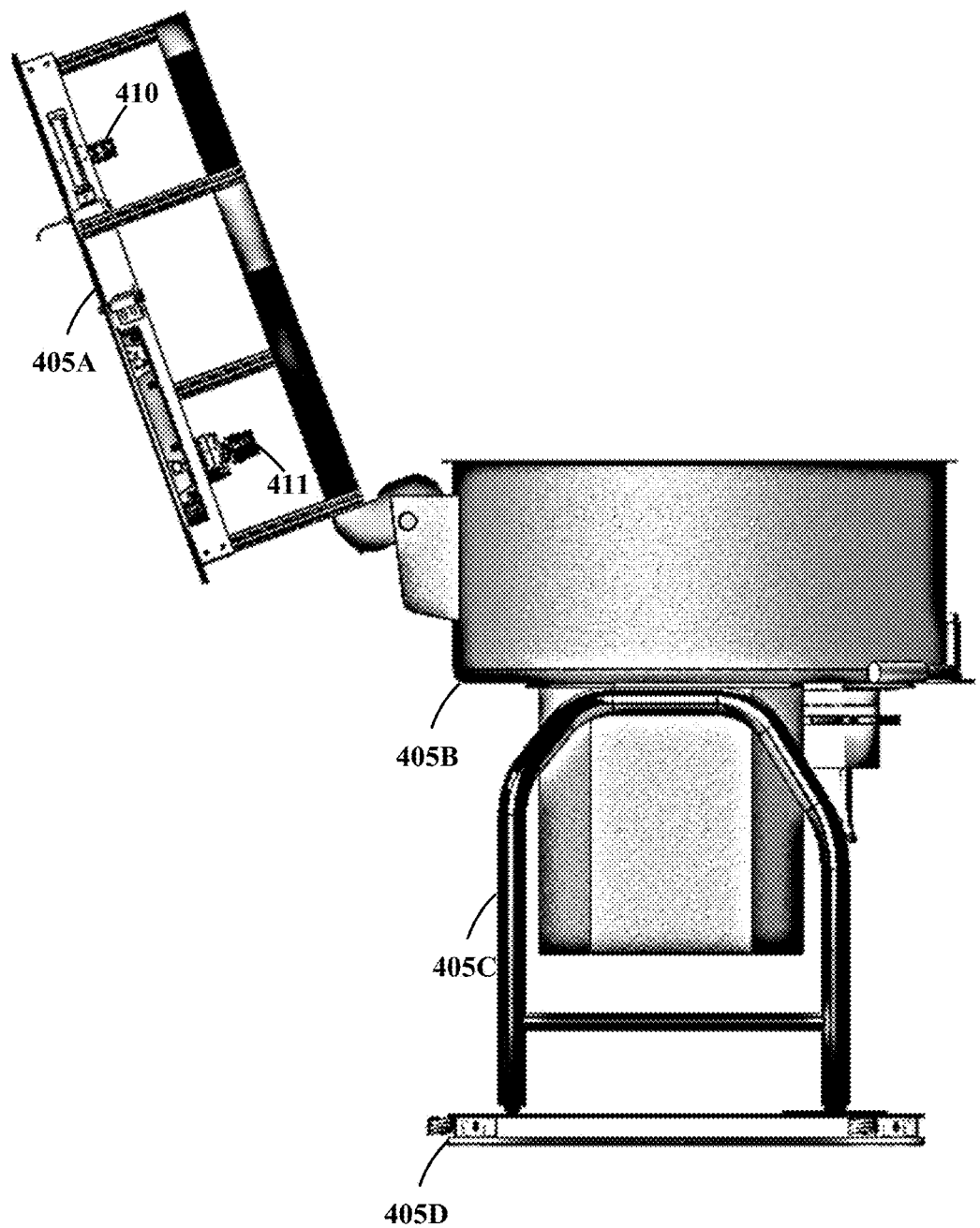
FIG. 4M illustrates a left view of an example system in an open configuration for characterizing concrete materials or a concrete mixture implemented in a mixer, consistent with certain examples of the present disclosure.
Figure 4N:
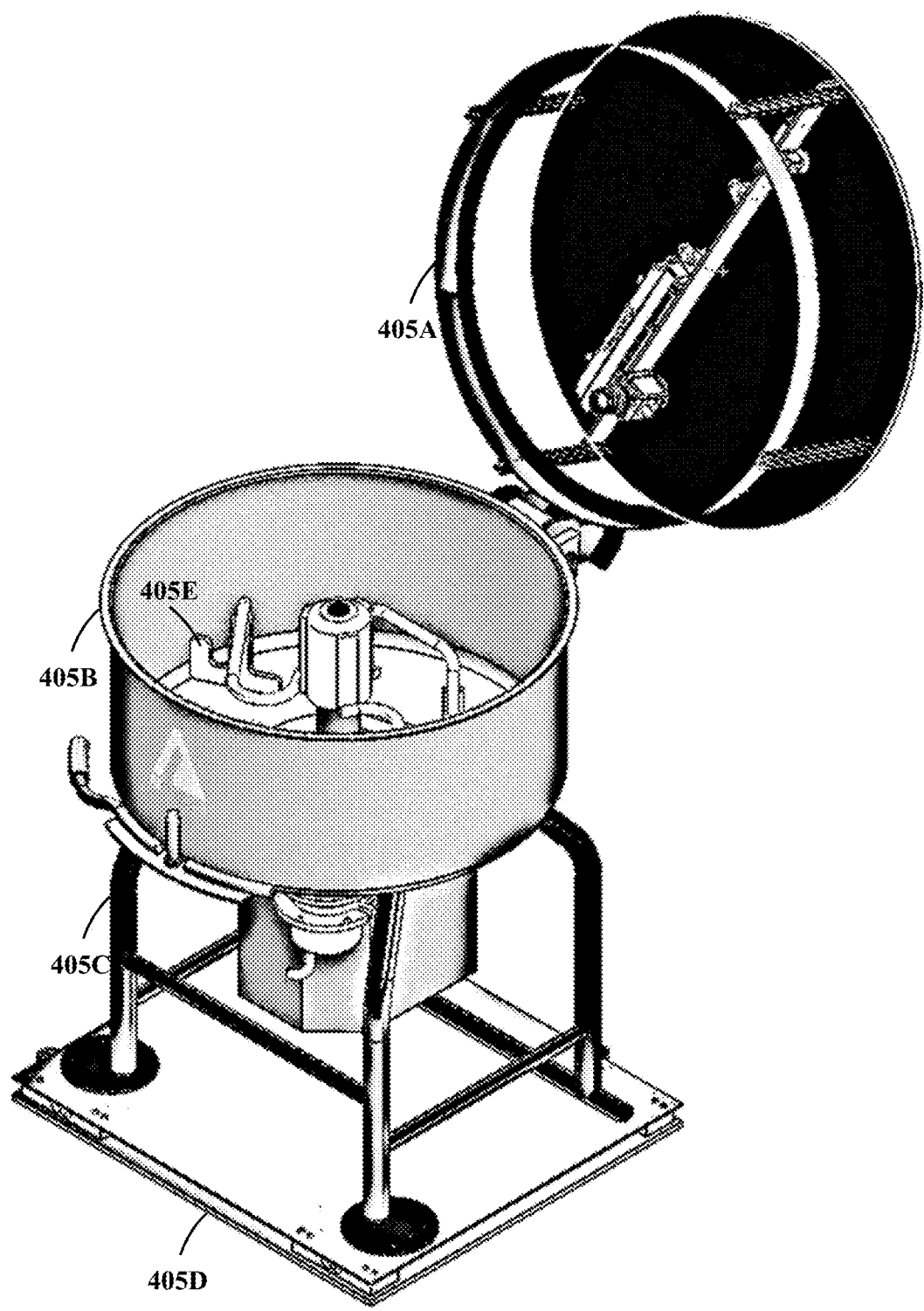
FIG. 4N illustrates a front-right topside perspective of an example system in an open configuration for characterizing concrete materials or a concrete mixture implemented in a mixer, consistent with certain examples of the present disclosure.
Figure 4O:
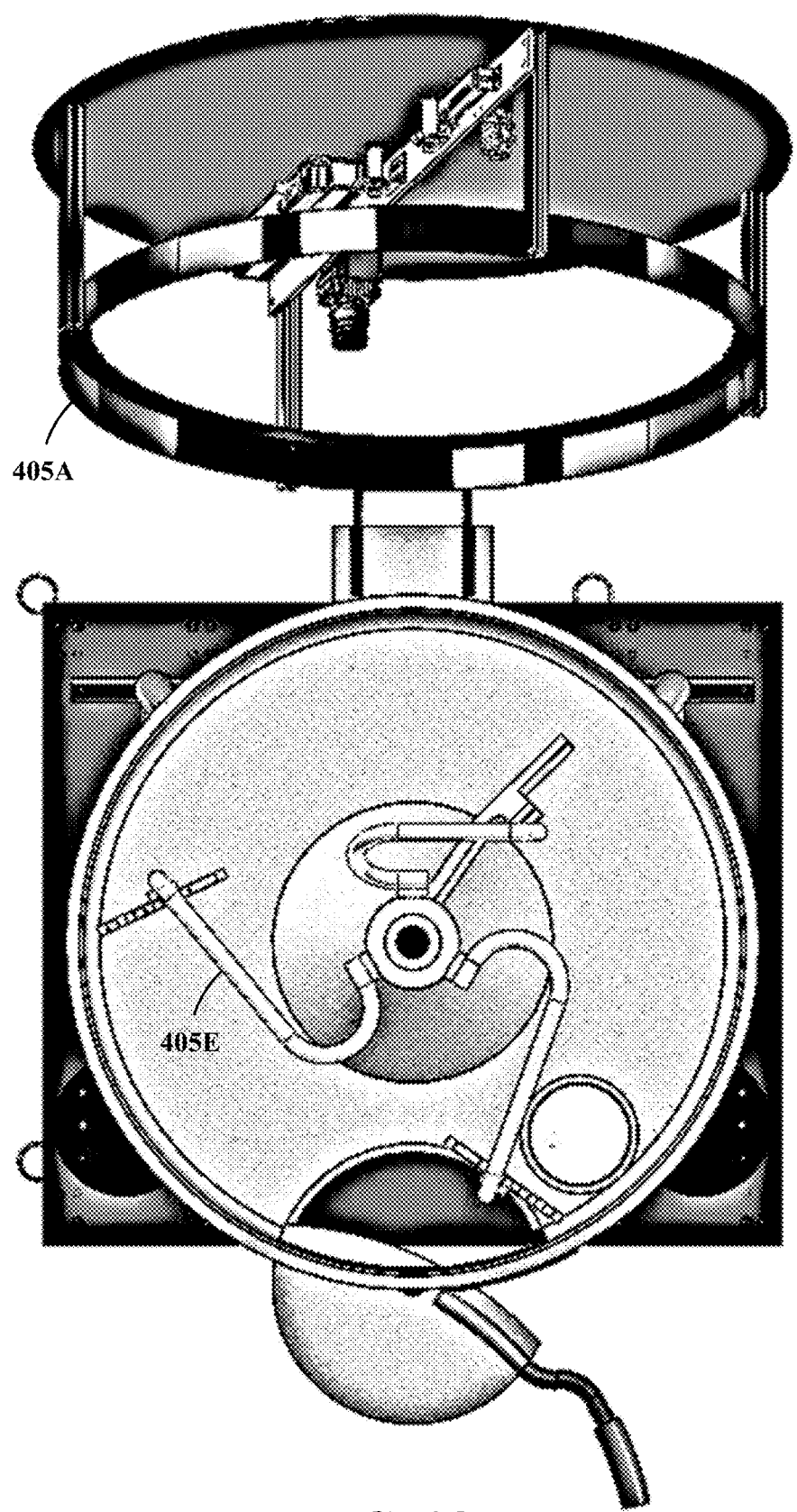
FIG. 4O illustrates a topside view of an example system in an open configuration for characterizing concrete materials or a concrete mixture implemented in a mixer, consistent with certain examples of the present disclosure.

FIGS. 4A-4O illustrate various perspectives of an example system for characterizing concrete materials or a concrete mixture implemented in a mixer, consistent with certain examples of the present disclosure. One or more aspects of the example system for characterizing the concrete materials or the concrete mixture implemented in the mixer of FIGS. 4A-4O may be the same as or similar to the example system diagram 100 of FIG. 1.

As illustrated in FIGS. 4A-4O, a data collection and characterization system is implemented on an industrial mixer. While illustrated as purpose-built industrial mixer, the data collection and characterization system may be implemented on any number of devices used for mixing, producing, or agitating concrete, such as a concrete material belts, concrete material bins, mixer trucks, concrete delivery trucks, or any other devices or systems used in the production or usage of concrete (or raw concrete materials). The mixer of FIGS. 4A-4O may be the same as or similar to the mixer of 105 in FIG. 1.

As illustrated, FIG. 4A illustrates an upper front-left perspective of an example system in a closed configuration; FIG. 4B illustrates an upper front view of an example system in a closed configuration; FIG. 4C illustrates an upper rear-right perspective of an example system in a closed configuration; FIG. 4D illustrates another upper front-left perspective of an example system in a closed configuration; FIG. 4E illustrates a front view of an example system in a closed configuration; FIG. 4F illustrates a rear view of an example system in a closed configuration; FIG. 4G illustrates a front-right topside perspective of an example system in a closed configuration; FIG. 4H illustrates a topside view of an example system in a closed configuration; FIG. 4I illustrates a lower front perspective of an example system; FIG. 4J illustrates an underside view of an example system; FIG. 4K illustrates a front-right underside perspective of an example system in a closed configuration; FIG. 4L illustrates another front-right underside perspective of an example system in a closed configuration; FIG. 4M illustrates a left view of an example system in an open configuration; FIG. 4N illustrates a front-right topside perspective of an example system in an open configuration; and FIG. 4O illustrates a topside view of an example system in an open configuration.

The mixer illustrated in FIGS. 4A-4O may include subcomponents of one or more of a lid 405A, a body 405B, a stand 405C, a base 405D, or a mixing mechanism 405E. In some cases, the lid 405A may include one or more sensors. In some cases, the one or more sensors may include components that may be the same as or similar to the sensing device 205 of FIG. 2. In some cases, the lid 405A may serve as a mount for one or more of an RGB camera 410, a SWIR camera 411, a temperature sensor 412, a humidity sensor 415, a visible light 416, or an infrared light 417. One or more of the RGB camera 410, the SWIR camera 411, the temperature sensor 412, or the humidity sensor 415 may be the same as or similar to the RGB camera 110, the SWIR camera 111, the temperature sensor 112, or the humidity sensor 115 of FIG. 1, respectively. The RGB camera 410 may be assisted in capturing image data in the visible light spectrum via the visible light 416 (e.g., a light emitting diode (LED) light). The infrared camera 411 may be assisted in capturing image data in the infrared light spectrum via the infrared light 417 (e.g., an infrared LED light). In some cases, the infrared light 417 may emit light at about 1450 nanometers, or some other suitable wavelength. While not illustrated, in some cases, the mixer of FIGS. 4A-4O may include a microwave moisture probe, a load cell, or any other suitable sensors for collecting data about the concrete materials or the concrete mixture in the mixer. In some cases, the lid 405A may be opened, creating the open configuration of FIGS. 4M-4O. In some cases, the lid 405A may be closed creating the closed configuration of FIGS. 4A-4G, 4K, and 4L.

The body 405B of the mixer of FIGS. 4A-4O may contain the concrete materials or the concrete mixture. The body 405B may be positioned below the lid 405A such that the one or more sensors (e.g., the RGB camera 410) mounted on the lid 405A may be configured to capture sensor data corresponding to the concrete materials or the concrete mixture contained in the body 405B. In some cases, the body 405B may be supported by the stand 405C or the base 405D. In some cases, the body 405B may include the mixing mechanism 405E that is configured to mix, produce, agitate, etc. the concrete materials (e.g., aggregates) or the concrete mixture contained in the body 405B.

FIGS. 5A-5E show various perspectives of an example mixer that may include a system for characterizing concrete materials or a concrete mixture, consistent with certain examples of the present disclosure. The mixer of FIGS. 5A-5E may be the same as or similar to the mixer of FIG. 1 or the mixer of FIGS. 4A-4O. For example, the mixer of FIGS. 5A-5E may have the data collection and characterization system of FIGS. 4A-4O added thereon, e.g., above the receptor for holding or mixing the concrete materials.

Figure 5A:
FIG. 5A shows a front-right perspective of an example mixer in a closed configuration that may include a system for characterizing concrete materials or a concrete mixture, consistent with certain examples of the present disclosure.
Figure 5B:
FIG. 5B shows a front-right perspective of an example mixer in an open configuration that may include a system for characterizing concrete materials or a concrete mixture, consistent with certain examples of the present disclosure.
Figure 5C:
FIG. 5C shows a lower front-right perspective of an example mixer that may include a system for characterizing concrete materials or a concrete mixture, consistent with certain examples of the present disclosure.
Figure 5D:
FIG. 5D shows a left view of an example mixer that may include a system for characterizing concrete materials or a concrete mixture, consistent with certain examples of the present disclosure.
Figure 5E:
FIG. 5E shows a front-left underside perspective of an example mixer that may include a system for characterizing concrete materials or a concrete mixture, consistent with certain examples of the present disclosure.

As shown, FIG. 5A shows a front-right perspective of an example mixer in a closed configuration; FIG. 5B shows a front-right perspective of an example mixer in an open configuration; FIG. 5C shows a lower front-right perspective of an example mixer; FIG. 5D shows a left view of an example mixer; and FIG. 5E shows a front-left underside perspective of an example mixer.

The mixer illustrated in FIGS. 5A-5E may include subcomponents of one or more of a lid 505A, a body 505B, a stand 505C, a base 505D, or a mixing mechanism (not shown). One or more of the lid 505A, the body 505B, the stand 505C, the base 505D, or the mixing mechanism may be the same as or similar to the lid 405A, the body 405B, the stand 405C, the base 405D, or the mixing mechanism 405E of FIG. 4, respectively.

Figure 6A:
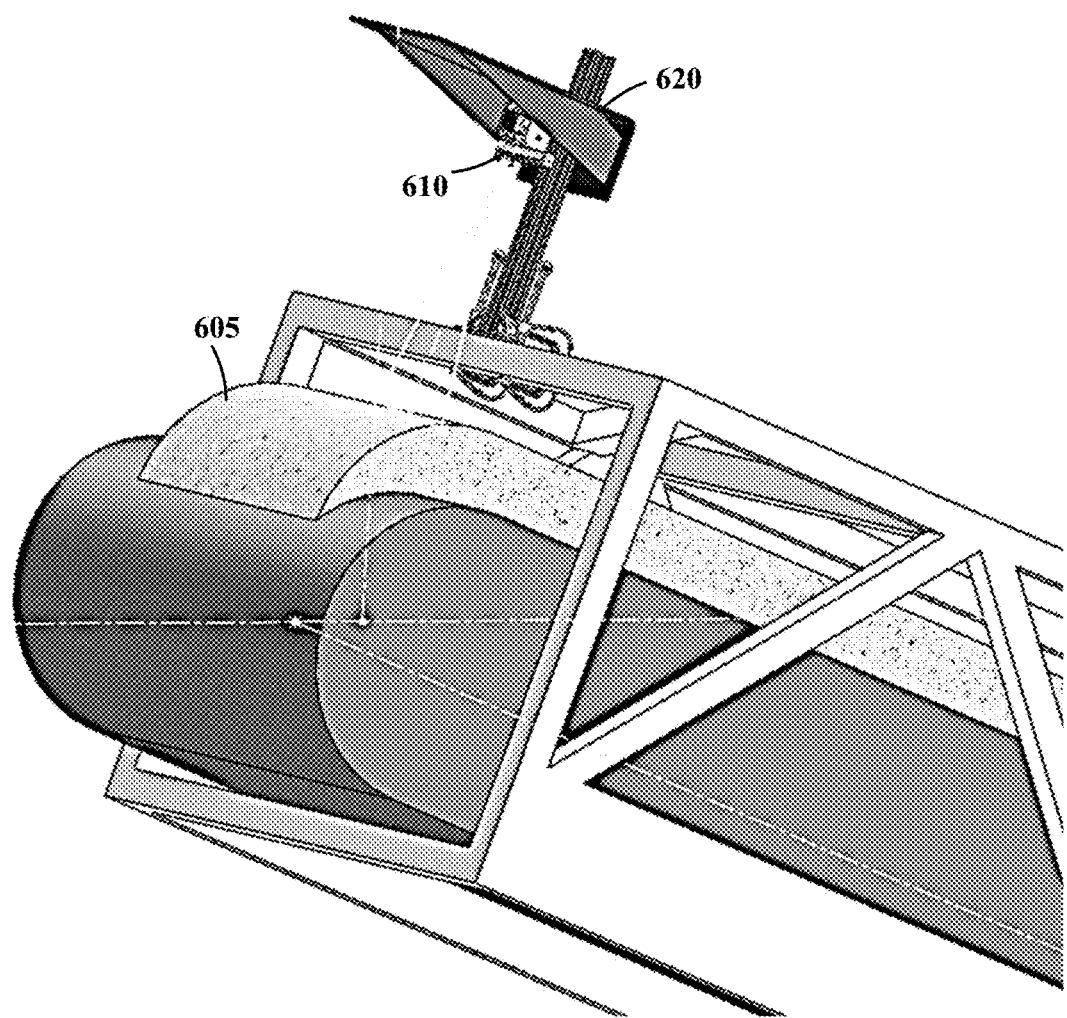
FIG. 6A illustrates a front-right perspective of an example conveyor system for characterizing concrete materials or a concrete mixture, consistent with certain examples of the present disclosure.
Figure 6B:
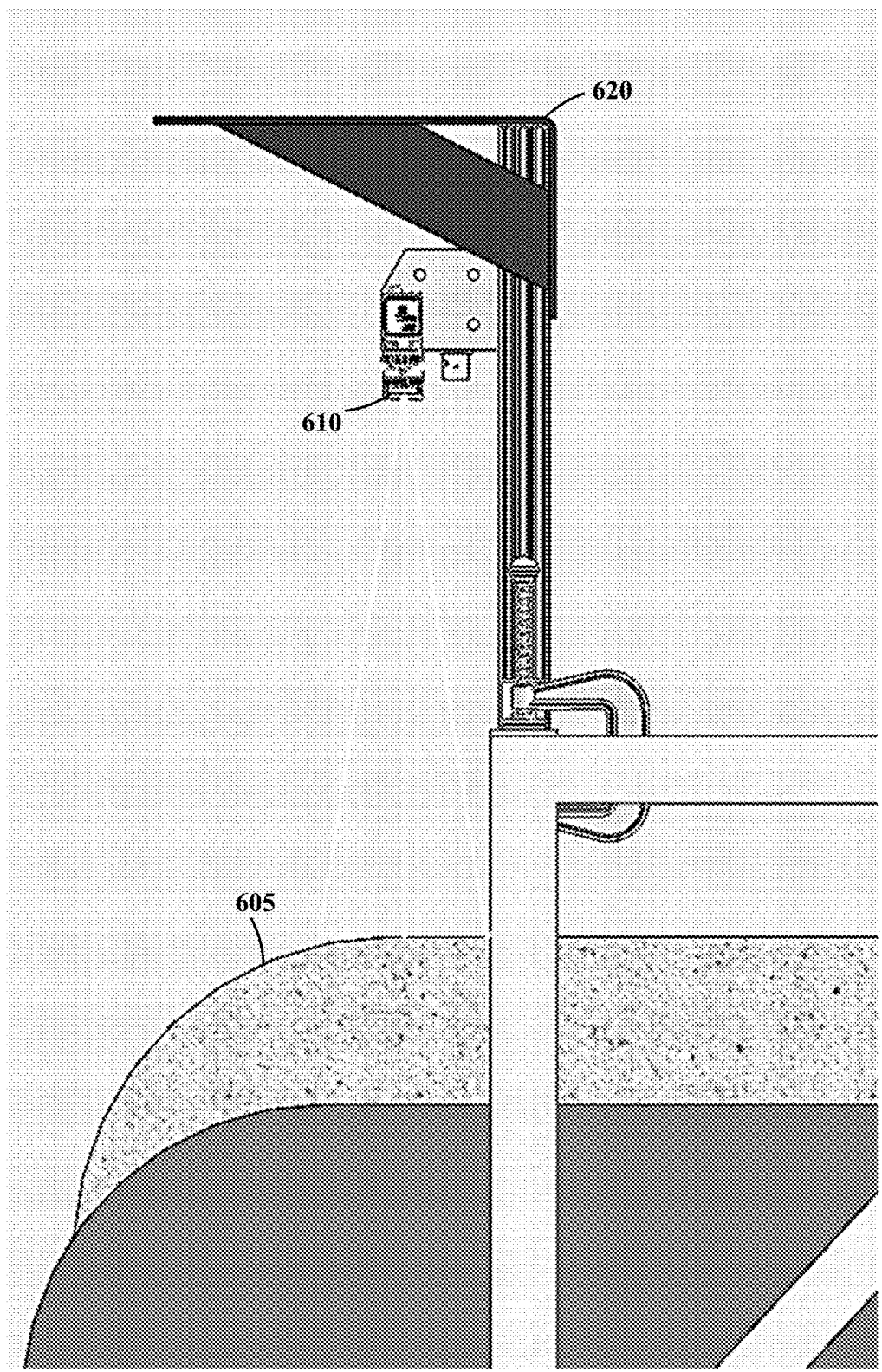
FIG. 6B illustrates a right view of an example conveyor system for characterizing concrete materials or a concrete mixture, consistent with certain examples of the present disclosure.
Figure 6C:
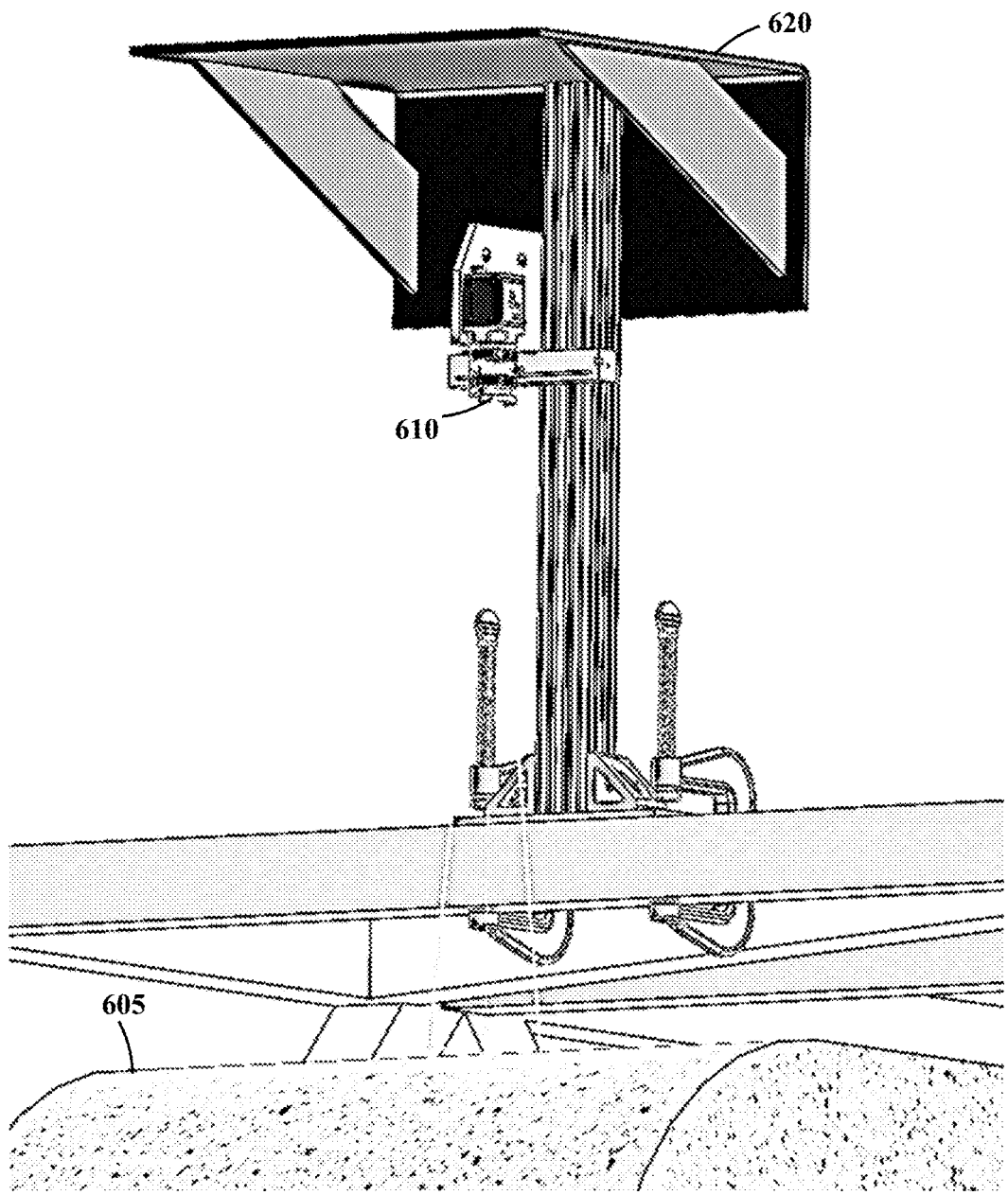
FIG. 6C illustrates a close front-right perspective of an example conveyor system for characterizing concrete materials or a concrete mixture, consistent with certain examples of the present disclosure.

FIGS. 6A-6C illustrate various perspectives of an example conveyor system for characterizing concrete materials or a concrete mixture, consistent with certain examples of the present disclosure. The conveyor system of FIGS. 6A-6C may have certain similarities (e.g., in components) to the mixer of FIG. 1 or the mixer of FIGS. 4A-4O. For example, the mixer of FIGS. 6A-6C may have the data collection and characterization system of FIGS. 4A-4O added thereon, e.g., above a conveyor 605, in a sensing device 610. The sensing device 610 may be the same as or similar to the sensing device 210 of FIG. 2. The sensing device 610 may be attached to s mechanical support 620 to position the sensing device 610 in an effective position relative to concrete materials or a concrete mixture.

As illustrated, FIG. 6A illustrates a front-right perspective of an example conveyor system for characterizing concrete materials or a concrete mixture; FIG. 6B illustrates a right view of an example conveyor system for characterizing concrete materials or a concrete mixture; and FIG. 6C illustrates a close front-right perspective of an example conveyor system for characterizing concrete materials or a concrete mixture.

FIGS. 7A-7D illustrate various perspectives of an example mixing system and conveyor system for characterizing concrete materials or a concrete mixture. As illustrated over FIGS. 7A-7D, the example mixing system and the example conveyor system may be positioned near one another such that the example conveyor system may deliver concrete materials or concrete mixture into the mixing system. As also illustrated over FIGS. 7A-7D, the example mixing system may include a sensing device 710A and the example conveyor system may include a sensing device 710B. The mixing system of FIGS. 7A, 7B, and 7D may have certain similarities (e.g., in components) to the mixer of FIG. 1 or the mixer of FIGS. 4A-4O. For example, the mixer of FIGS. 7A, 7B, and 7D may have the data collection and characterization system of FIGS. 4A-4O added thereon, e.g., above a conveyor 605, in a sensing device 610. The conveyor system of FIGS. 7C and 7D may have certain similarities (e.g., in components) to the conveyor system of FIGS. 6A-6C. The sensing devices 710A and 710B may be the same as or similar to the sensing device 210 of FIG. 2. The sensing device 710B may be attached to mechanical support 720 to position the sensing device 710 in an effective position relative to concrete materials or a concrete mixture.

Figure 7A:
FIG. 7A shows a front perspective of an example mixing system for characterizing concrete materials or a concrete mixture, consistent with certain examples of the present disclosure.
Figure 7B:
FIG. 7B shows a rear perspective of an example mixing system for characterizing concrete materials or a concrete mixture, consistent with certain examples of the present disclosure.
Figure 7C:
FIG. 7C shows a right view of an example conveyor system for characterizing concrete materials or a concrete mixture, consistent with certain examples of the present disclosure.
Figure 7D:
FIG. 7D shows an example mixing system and conveyor system for characterizing concrete materials or a concrete mixture, consistent with certain examples of the present disclosure.

As shown, FIG. 7A shows a front perspective of an example mixing system for characterizing concrete materials or a concrete mixture; FIG. 7B shows a rear perspective of an example mixing system for characterizing concrete materials or a concrete mixture; FIG. 7C shows a right view of an example conveyor system for characterizing concrete materials or a concrete mixture; and FIG. 7D shows an example mixing system and conveyor system for characterizing concrete materials or a concrete mixture.

Example Methods

Figure 8:
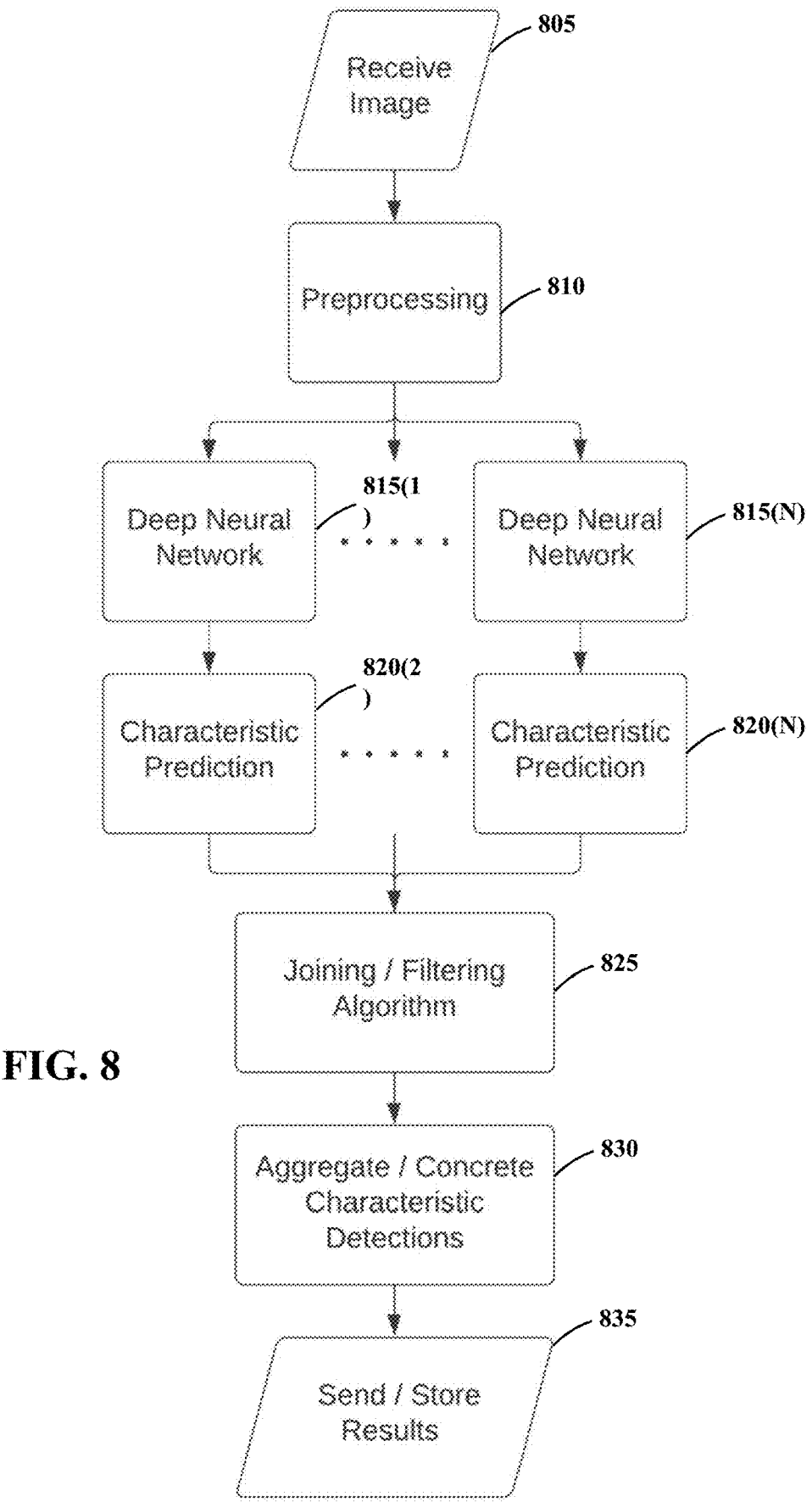
FIG. 8 illustrates an example method for detecting aggregate or concrete characteristics, consistent with certain examples of the present disclosure.

FIG. 8 illustrates an example method 800 for detecting aggregate or concrete characteristics. In some cases, the method 800 may use one or more deep neural networks (DNNs) in parallel or in series that may provide raw predictions that may then be combined or filtered. In some cases, with the method 800, it may be possible to combine results from multiple images prior to performing final detections. The detections may then be presented, sent, or stored.

The method 800 may include receiving an image at block 805 (e.g., from a camera) of concrete materials or a concrete mixture. The image may be preprocessed at block 810 (e.g., filtered, segmented, labeled, etc.). The image may be input to a DNN at block 815 and a characteristic may be predicted at block 820. For cases with multiple images (or multiple segments of an image), each image (or image segment) may be processed in parallel or in series by multiple DNNs. Each processed image (or image segment) may then be joined at block 825. Based at least in part on this joined output from block 825, aggregate or concrete characteristics may be detected at block 830. The detected characteristics may be presented (e.g., at a graphical user interface), sent (e.g., via a network), or stored (e.g., in a memory) at block 835.

Figure 9:
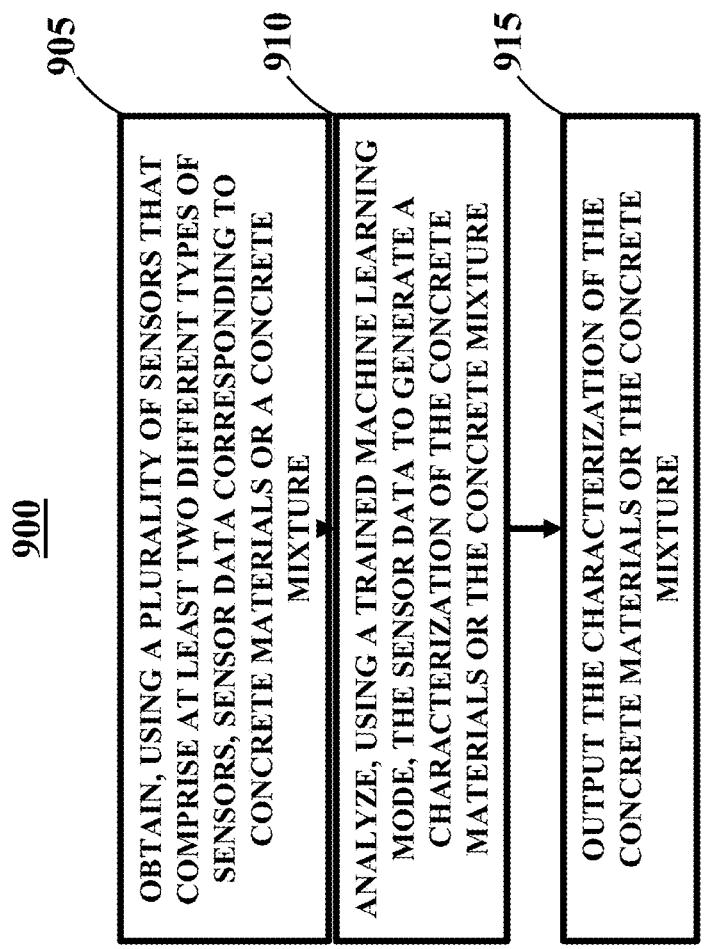
FIG. 9 illustrates an example method for characterizing concrete materials or a concrete mixture, consistent with certain examples of the present disclosure.

FIG. 9 illustrates an example method 900 for characterizing concrete materials or a concrete mixture, consistent with certain examples of the present disclosure. The systems, the methods, the computer-readable media, and the techniques of the present disclosure can be implemented by way of one or more algorithms. The one or more algorithms can be implemented by way of software upon execution by a central processing unit (e.g., the central processing unit 1105). A first algorithm of the one or more algorithms can, for example, implement the method 900. At a high level, the method 900 may include one or more operations for characterizing the concrete materials or the concrete mixture, including: obtaining, using a plurality of sensors that comprise at least two different types of sensors, sensor data corresponding to the concrete materials or the concrete mixtures (block 905); analyzing, using a trained machine learning model, the sensor data to generate the characterization of the concrete materials or the concrete mixture (block 910); and outputting the characterization of the concrete materials or the concrete mixture (block 915).

In some cases, the method 900 may begin with obtaining, using the plurality of sensors that comprise at least two different types of sensors, the sensor data corresponding to the concrete materials or the concrete mixtures (block 905). The concrete materials or the concrete mixture may be the same as or similar to the concrete materials or the concrete mixture of 105 of FIG. 1. The plurality of sensors may be the same as or similar to the sensors 110-115 of FIG. 1. For example, the plurality of sensors may include the RGB camera 110, the SWIR camera 111, and the temperature sensor 112. In such examples, the RGB camera 110 may generate visible light image data that is included in the sensor data, the SWIRD camera 111 may generate infrared light image data that is included in the sensor data, and the temperature sensor 112 may generate temperature data that is included in the sensor data. The concrete materials may include aggregate (e.g., fine and coarse). The concrete mixture may include cement, water, and aggregates.

In some cases, the method 900 may continue with analyzing, using the trained machine learning model, the sensor data to generate the characterization of the concrete materials or the concrete mixture (block 910). The trained machine learning model may be the same as or similar to one or more of the machine learning models, techniques, algorithms, etc. described in the "Example Machine Learning Techniques" section. For example, the trained machine learning model may be a deep learning model. In another example, the trained machine learning model may comprise (or use) one or more of: a convolutional neural network, a vision transformer, a long short-term memory network, a masked autoencoder, a random forest, or a support vector machine.

In some cases, the method 900 may continue with outputting the characterization of the concrete materials or the concrete mixture (block 915). In some cases, outputting the characterization of the concrete materials includes displaying, on a graphical interface, the characterization of the concrete materials. The graphical interface may be the same as or similar to the electronic display 1135 or the user interface 1140. In some cases, outputting the characterization of the concrete materials includes storing, in a memory, the characterization of the concrete materials. The memory may be the same as or similar to the memory 1110 of FIG. 11. In cases where the characterization includes a characterization of the concrete materials, the characterization comprises one or both of physical properties or chemical properties of the concrete materials, such as one or more of aggregate moisture, particle size distribution, shape, surface qualities, or cleanliness. In cases where the characterization includes a characterization of the concrete mixture, the characterization comprises one or both of physical properties or chemical properties of the concrete mixture, such as one or more of slump, air content, or actual water-to-cementitious materials ratio.

Figure 10:
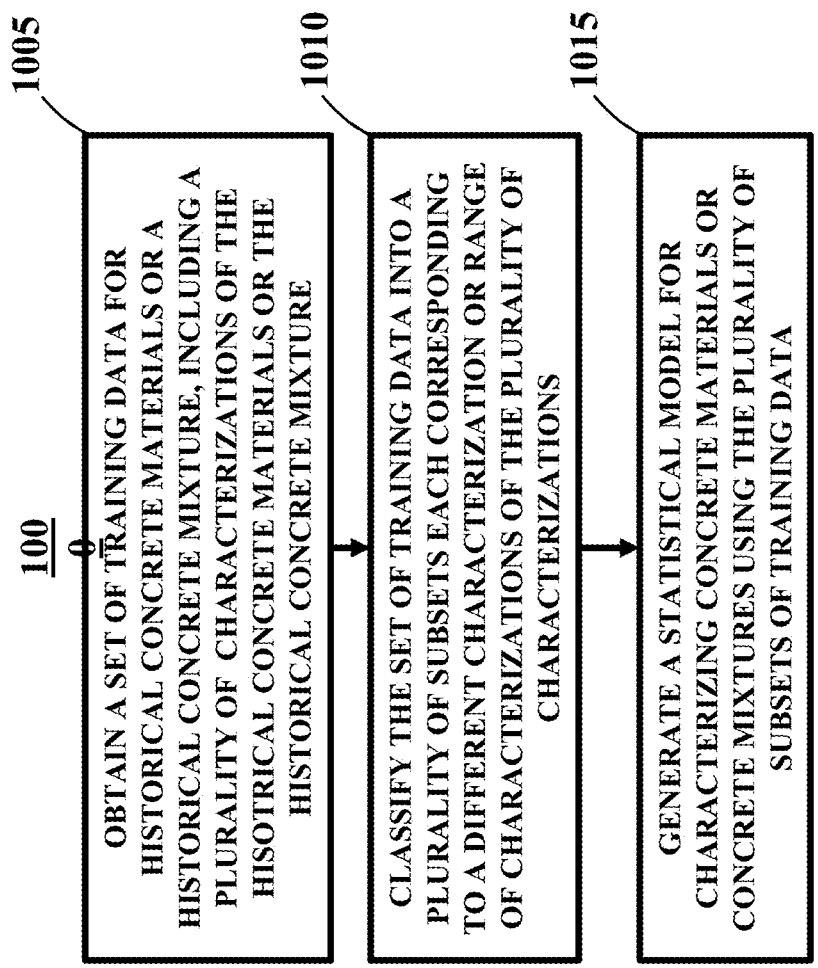
FIG. 10 illustrates an example method for training a statistical model to characterize concrete materials or a concrete mixture, consistent with certain examples of the present disclosure.

FIG. 10 illustrates an example method for training a statistical model to characterize concrete materials or a concrete mixture, consistent with certain examples of the present disclosure. The systems, the methods, the computer-readable media, and the techniques of the present disclosure can be implemented by way of one or more algorithms. The one or more algorithms can be implemented by way of software upon execution by a central processing unit (e.g., the central processing unit 1105). A second algorithm of the one or more algorithms can, for example, implement the method 1000. At a high level, the method 1000 may include one or more operations for training a statistical model to characterize concrete materials or a concrete mixture, including: obtaining a set of training data for historical concrete materials or a historical concrete mixture, including a plurality of characterizations of the historical concrete materials or the historical concrete mixture (block 1005); classifying, by the one or more processors, the set of training data into a plurality of subsets each corresponding to a different characterization or range of characterizations of the plurality of characterizations (block 1010); and generating, by the one or more processors, the statistical model for characterizing concrete materials or concrete mixtures using the plurality of subsets of training data (block 1015).

In some cases, the method 1000 may begin with obtaining a set of training data for historical concrete materials or a historical concrete mixture, including a plurality of characterizations of the historical concrete materials or the historical concrete mixture (block 1005). In some cases, the training data may be obtained from a database, such as the labeled data storage 140 of FIG. 1, which may be one or more of a server, a memory, a computer, etc. In some cases, the training data may be obtained from one or more sensors, such as the sensors 110-115. For example, the RGB camera 110, the SWIR camera 111, the temperature sensor 112 may form input data for historical concrete materials or a historical concrete mixture and the microwave moisture probe 113 and the load cell 114 may form a moisture ground truth that may serve as the characterizations for the historical concrete materials or the historical concrete mixture. In some cases, the training data may be generated using one or more self-supervised techniques, such as masked autoencoding.

In some cases, the method 1000 may continue with classifying the set of training data into a plurality of subsets each corresponding to a different characterization or range of characterizations of the plurality of characterizations (block 1010). In some cases, characterizations may be related to physical properties or chemical properties for the concrete materials or the concrete mixture and the plurality of subsets may be formed based at least in part on the physical properties or chemical properties or ranges of the physical properties or the chemical properties. For example, when the characterizations correspond to the concrete materials, the plurality of subsets may be formed based at least in part on one or more of aggregate moisture, particle size distribution, shape, surface qualities, or cleanliness. For example, when the characterizations correspond to the concrete mixture, the plurality of subsets may be formed based at least in part on slump, air content, or actual water-to-cementitious materials ratio.

In some cases, the method 1000 may continue with generating the statistical model for characterizing concrete materials or concrete mixtures using the plurality of subsets of training data (block 1015). The statistical model may be stored for present or future use. The statistical model may be stored as sets of parameter values or weights for analysis of further input (e.g., further relevant parameters to use as further predicted variables, further explanatory variables, further user interaction data, etc.), which may also include analysis logic or indications of model validity in some instances. In some cases, a plurality of statistical model may be stored for generating predictions under different sets of input data conditions. In some embodiments, the statistical model may be stored in a database (e.g., associated with a server). In some cases, the statistical model may not implement machine learning or artificial intelligence techniques, such as instead using deterministic techniques, expert-rule techniques, rule-based techniques, etc. In some cases, the statistical model may implement machine learning or artificial intelligence techniques, such as using deep learning, convolutional neural network, a vision transformer, a long short-term memory network, a random forest, a support vector machine, or any other suitable machine learning technique disclosed in the "Example Machine Learning Techniques" section. In some cases, the statistical model of FIG. 10 may implement one or more operations of the method 900 of FIG. 9.

Any number of operations of the methods of FIG. 9 or 10 may be added or removed. Further, the operations of the methods of FIG. 9 or 10 may be performed in any order. Further, one or more of the operations of the methods of FIG. 9 or 10 may be repeated, e.g., iteratively.

Example Computer Systems

Figure 11:
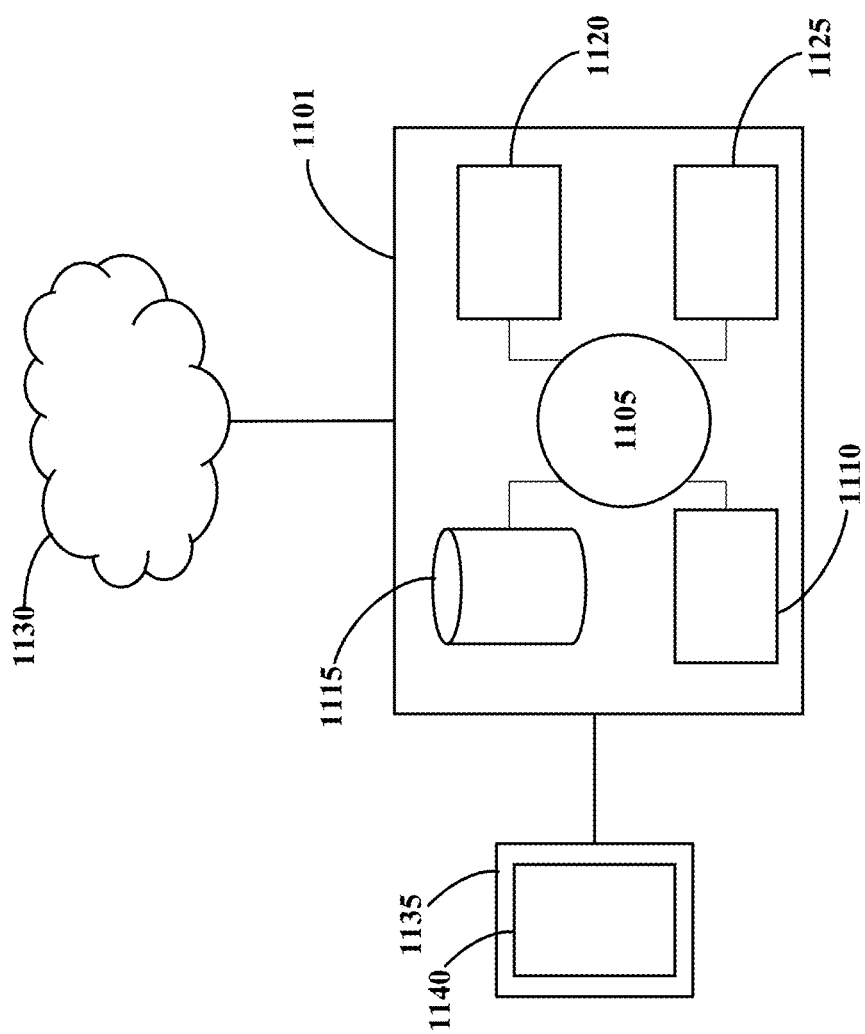
FIG. 11 illustrates an example computer control system that is programmed or otherwise configured to implement methods provided herein, consistent with certain examples of the present disclosure.

FIG. 11 shows a computer system 1101 that is programmed or otherwise configured to operate the systems, the methods, the computer-readable media, or the techniques disclosed herein (such as the systems, the methods, the computer-readable media, or the techniques of characterizing concrete materials or a concrete mixture). The computer system 1101 can regulate various aspects of the present disclosure. The computer system 1101 can be an electronic device of a user or a computer system that is remotely located with respect to the electronic device. The electronic device can be a mobile electronic device. In some cases, the computer system 1101 may be the same as or similar to the computer 130 of FIG. 1. In some cases, the computer system 1101 may be the same as or similar to computers included in the data collection and characterization system of FIGS. 4A-4O or FIGS. 5A-5E. In some cases, the computer system 1101 may be the same as or similar to the concrete ML/optimization system(s) 310 of FIG. 3.

The computer system 1101 includes a central processing unit (CPU, also "processor" and "computer processor" herein) 1105, which can be a single core or multi core processor, or a plurality of processors for parallel processing. The computer system 1101 also includes memory or memory location 1110 (e.g., random-access memory, read-only memory, flash memory), electronic storage unit 1115 (e.g., hard disk), communication interface 1120 (e.g., network adapter) for communicating with one or more other systems, and peripheral devices 1125, such as cache, other memory, data storage and/or electronic display adapters. The memory 1110, storage unit 1115, interface 1120 and peripheral devices 1125 are in communication with the CPU 1105 through a communication bus (solid lines), such as a motherboard. The storage unit 1115 can be a data storage unit (or data repository) for storing data. The computer system 1101 can be operatively coupled to a computer network ("network") 1130 with the aid of the communication interface 1120. The network 1130 can be the Internet, an internet and/or extranet, or an intranet and/or extranet that is in communication with the Internet. The network 1130 in some cases is a telecommunication and/or data network. The network 1130 can include one or more computer servers, which can enable distributed computing, such as cloud computing. The network 1130, in some cases with the aid of the computer system 1101, can implement a peer-to-peer network, which may enable devices coupled to the computer system 1101 to behave as a client or a server.

The CPU 1105 can execute a sequence of machine-readable instructions, which can be embodied in a program or software. The instructions may be stored in a memory location, such as the memory 1110. The instructions can be directed to the CPU 1105, which can subsequently program or otherwise configure the CPU 1105 to implement methods of the present disclosure. Examples of operations performed by the CPU 1105 can include fetch, decode, execute, and writeback.

The CPU 1105 can be part of a circuit, such as an integrated circuit. One or more other components of the system 1101 can be included in the circuit. In some cases, the circuit is an application specific integrated circuit (ASIC).

The storage unit 1115 can store files, such as drivers, libraries and saved programs. The storage unit 1115 can store user data, e.g., user preferences and user programs. The computer system 1101 in some cases can include one or more additional data storage units that are external to the computer system 1101, such as located on a remote server that is in communication with the computer system 1101 through an intranet or the Internet.

The computer system 1101 can communicate with one or more remote computer systems through the network 1130. For instance, the computer system 1101 can communicate with a remote computer system of a user. Examples of remote computer systems include personal computers (e.g., portable PC), slate or tablet PC's (e.g., Apple® iPad, Samsung® Galaxy Tab), telephones, Smart phones (e.g., Apple® iphone, Android-enabled device, Blackberry®), or personal digital assistants. The user can access the computer system 1101 via the network 1130.

Methods as disclosed herein can be implemented by way of machine (e.g., computer processor) executable code stored on an electronic storage location of the computer system 1101, such as, for example, on the memory 1110 or electronic storage unit 1115. The machine executable or machine-readable code can be provided in the form of software. During use, the code can be executed by the processor 1105. In some cases, the code can be retrieved from the storage unit 1115 and stored on the memory 1110 for ready access by the processor 1105. In some situations, the electronic storage unit 1115 can be precluded, and machine-executable instructions are stored on memory 1110.

The code can be pre-compiled and configured for use with a machine having a processer adapted to execute the code or can be compiled during runtime. The code can be supplied in a programming language that can be selected to enable the code to execute in a pre-compiled or as-compiled fashion.

Aspects of the systems and methods provided herein, such as the computer system 1101, can be embodied in programming. Various aspects of the technology may be thought of as "products" or "articles of manufacture" typically in the form of machine (or processor) executable code and/or associated data that is carried on or embodied in a type of machine-readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine-readable medium, such as computer-executable code (e.g., computer-readable media), may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 1101 can include or be in communication with an electronic display 1135 that comprises a user interface (UI) 1140. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 1105.

Example Machine Learning Techniques

In some cases, the systems, the methods, the computer-readable media, and the techniques disclosed herein may use various machine learning techniques. In some cases, ML may generally involve identifying and recognizing patterns in existing data in order to facilitate making predictions for subsequent data. ML may include a ML model (which may include, for example, a ML algorithm). Machine learning, whether analytical or statistical in nature, may provide deductive or abductive inference based on real or simulated data. The ML model may be a trained model. ML techniques may comprise one or more supervised, semi-supervised, self-supervised, or unsupervised ML techniques. For example, an ML model may be a trained model that is trained through supervised learning (e.g., various parameters are determined as weights or scaling factors). ML may comprise one or more of regression analysis, regularization, classification, dimensionality reduction, ensemble learning, meta learning, association rule learning, cluster analysis, anomaly detection, deep learning, or ultra-deep learning. ML may comprise, but is not limited to: k-means, k-means clustering, k-nearest neighbors, learning vector quantization, linear regression, non-linear regression, least squares regression, partial least squares regression, logistic regression, stepwise regression, multivariate adaptive regression splines, ridge regression, principal component regression, least absolute shrinkage and selection operation (LASSO), least angle regression, canonical correlation analysis, factor analysis, independent component analysis, linear discriminant analysis, multidimensional scaling, non-negative matrix factorization, principal components analysis, principal coordinates analysis, projection pursuit, Sammon mapping, t-distributed stochastic neighbor embedding, Ada-Boosting, boosting, gradient boosting, bootstrap aggregation, ensemble averaging, decision trees, conditional decision trees, boosted decision trees, gradient boosted decision trees, random forests, stacked generalization, Bayesian networks, Bayesian belief networks, naïve Bayes, Gaussian naïve Bayes, multinomial naïve Bayes, hidden Markov models, hierarchical hidden Markov models, support vector machines, encoders, decoders, auto-encoders, stacked auto-encoders, perceptrons, multi-layer perceptrons, artificial neural networks, feedforward neural networks, convolutional neural networks, recurrent neural networks, long short-term memory, deep belief networks, deep Boltzmann machines, deep convolutional neural networks, deep recurrent neural networks, generative adversarial networks, vision transformers, long short-term memory networks (LSTM), masked autoencoders, etc.

Training the ML model may include, in some cases, selecting one or more untrained data models to train using a training data set. The selected untrained data models may include any type of untrained ML models for supervised, semi-supervised, self-supervised, or unsupervised machine learning. The selected untrained data models be specified based upon input (e.g., user input) specifying relevant parameters to use as predicted variables or other variables to use as potential explanatory variables. For example, the selected untrained data models may be specified to generate an output (e.g., a prediction) based upon the input. Conditions for training the ML model from the selected untrained data models may likewise be selected, such as limits on the ML model complexity or limits on the ML model refinement past a certain point. The ML model may be trained (e.g., via a computer system such as a server) using the training data set. In some cases, a first subset of the training data set may be selected to train the ML model. The selected untrained data models may then be trained on the first subset of training data set using appropriate ML techniques, based upon the type of ML model selected and any conditions specified for training the ML model. In some cases, due to the processing power requirements of training the ML model, the selected untrained data models may be trained using additional computing resources (e.g., cloud computing resources). Such training may continue, in some cases, until at least one aspect of the ML model is validated and meets selection criteria to be used as a predictive model.

In some cases, one or more aspects of the ML model may be validated using a second subset of the training data set (e.g., distinct from the first subset of the training data set) to determine accuracy and robustness of the ML model. Such validation may include applying the ML model to the second subset of the training data set to make predictions derived from the second subset of the training data. The ML model may then be evaluated to determine whether performance is sufficient based upon the derived predictions. The sufficiency criteria applied to the ML model may vary depending upon the size of the training data set available for training, the performance of previous iterations of trained models, or user-specified performance requirements. If the ML model does not achieve sufficient performance, additional training may be performed. Additional training may include refinement of the ML model or retraining on a different first subset of the training dataset, after which the new ML model may again be validated and assessed. When the ML model has achieved sufficient performance, in some cases, the ML may be stored for present or future use. The ML model may be stored as sets of parameter values or weights for analysis of further input (e.g., further relevant parameters to use as further predicted variables, further explanatory variables, further user interaction data, etc.), which may also include analysis logic or indications of model validity in some instances. In some cases, a plurality of ML models may be stored for generating predictions under different sets of input data conditions. In some embodiments, the ML model may be stored in a database (e.g., associated with a server).

The systems, the methods, the computer-readable media, and the techniques disclosed herein may implement one or more computer vision techniques. Computer vision is a field of artificial intelligence that uses computers to interpret and understand the visual world at least in part by processing one or more digital images from cameras and videos. In some instances, computer vision may use deep learning models (e.g., convolutional neural networks). Bounding boxes and tracking techniques may be used in object detection techniques within computer vision.

The systems, the methods, the computer-readable media, and the techniques disclosed herein may implement one or more deep-learning techniques. Deep learning is an example of ML that may be based on a set of algorithms that attempt to model high-level abstractions in data by using multiple processing layers, with complex structures or otherwise, composed of multiple non-linear transformations. In some cases, a drop out method can be used to reduce overfitting. At each training stage, individual nodes are either "dropped out" of the net (e.g., ignored) with probability 1−p or kept with probability p, so that a reduced network is left; incoming and outgoing edges to a dropped-out node may also be removed. In some cases, the reduced network is trained on the data in that stage. The removed nodes may then be reinserted into the network with their original weights.

The systems, the methods, the computer-readable media, and the techniques disclosed herein may implement one or more vision transformer (ViT) techniques. A ViT is a transformer-like model that handles vision processing tasks. While CNNs use convolution, a "local" operation bounded to a small neighborhood of an image, ViTs use self-attention, a "global" operation, since the ViT draws information from the whole image. This allows the ViT to capture distant semantic relevances in an image effectively. Advantageously, ViTs may be well-suited catching long-term dependencies. In some cases, ViTs may be a competitive alternative to convolutional neural networks as ViTs may outperform the current state-of-the-art CNNs by almost four times in terms of computational efficiency and accuracy. ViTs may be well-suited to object detection, image segmentation, image classification, and action recognition. Moreover, ViTs may be applied in generative modeling and multi-model tasks, including visual grounding, visual-question answering, and visual reasoning. In some cases, ViTs may represent images as sequences, and class labels for the image are predicted, which allows models to learn image structure independently. Input images may be treated as a sequence of patches where every patch is flattened into a single vector by concatenating the channels of all pixels in a patch and then linearly projecting it to the desired input dimension. For example, a ViT architecture may include the following operations: (A) split an image into patches; (B) flatten the patches; (C) generate lower-dimensional linear embeddings from the flattened patches; (D) add positional embeddings; (E) provide the sequence as an input to a standard transformer encoder; (F) pretrain a model with image labels (e.g., fully supervised on a huge dataset); and (G) finetune on the downstream dataset for image classification. In some cases, there may be multiple blocks in a ViT encoder, with each block comprising three major processing elements: (1) Layer Norm; (2) Multi-head Attention Network; and (3) Multi-Layer Perceptrons. The Layer Norm may keep the training process on track and enable the model to adapt to the variations among the training images. The Multi-head Attention Network may be a network responsible for generating attention maps from the given embedded visual tokens. These attention maps may help the network focus on the most critical regions in the image, such as object(s). The Multi-Layer Perceptrons may be a two-layer classification network with a Gaussian Error Linear Unit at the end. The final Multi-Layer Perceptrons block may be used as an output of the transformer. An application of softmax on this output can provide classification labels (e.g., if the application is image classification).

The systems, the methods, the computer-readable media, and the techniques disclosed herein may implement one or more masked autoencoder (MAE) techniques. MAEs are scalable self-supervised learners for computer vision. The MAE leverages the success of autoencoders for various imaging and natural language processing tasks. Some computer vision models may be trained using supervised learning, such as using humans to look at images and created labels for the images, so that the model could learn the patterns of those labels (e.g., a human annotator would assign a class label to an image or draw bounding boxes around objects in the image). In contrast, self-supervised learning may not use any human-created labels. One technique for self-supervised image processing training using an MAE is for before an image is input into an encoder transformer, a certain set of masks are applied to the image. Due to the masks, pixels are removed from the image and therefore the model is provided an incomplete image. At a high level, the model's task is to now learn what the full, original image looked like before the mask was applied.

In other words, MAE may include masking random patches of an input image and reconstructing the missing pixels. The MAE may be based on two core designs. First, an asymmetric encoder-decoder architecture, with an encoder that operates on the visible subset of patches (without mask tokens), along with a lightweight decoder that reconstructs the original image from the latent representation and mask tokens. Second, masking a high proportion of the input image, e.g., 75%, may yield a nontrivial and meaningful self-supervisory task. Coupling these two core designs enables training large models efficiently and effectively, thereby accelerating training (e.g., by 3× or more) and improving accuracy. MAE techniques may be scalable, enabling learning of high-capacity models that generalize well, e.g., a vanilla ViT-Huge model. As mentioned, the MAE may be effective in pre-training ViTs for natural image analysis. In some cases, the MAE uses the characteristic of redundancy of image information to observe partial images to reconstruct original images as a proxy task, and the encoder of the MAE may have the capability of deducing the content of the masked image area by aggregating context information. This contextual aggregation capability may be important in the field of image processing and analysis.

The systems, the methods, the computer-readable media, and the techniques disclosed herein may implement one or more decision tree or random forest techniques. A decision tree may be a supervised ML algorithm that can be applied to both regression and classification problems. Decision trees may mimic the decision-making process of a human brain. For example, a decision tree may grow from a root (base condition), and when it meets a condition (internal node/feature), it may split into multiple branches. The end of the branch that does not split anymore may be an outcome (leaf). A decision tree can be generated using a training data set according to the following operations: (1) Starting from a root node (the entire dataset), the algorithm may split the dataset in two branches using a decision rule or branching criterion; (2) each of these two branches may generate a new child node; (3) for each new child node, the branching process may be repeated until the dataset cannot be split any further; (4) each branching criterion may be chosen to maximize information gain (e.g., a quantification of how much a branching criterion reduces a quantification of how mixed the labels are in the children nodes). The labels may be the data or the classification that is predicted by the decision tree.

A random forest regression is an extension of the decision tree model that tends to yield more robust predictions by stretching the use of the training data partition. Whereas a decision tree may make a single pass through the data, a random forest regression may bootstrap 50% of the data (e.g., with replacement) and build many trees. Rather than using all explanatory variables as candidates for splitting, a random subset of candidate variables may be used for splitting, which may enable trees that have completely different data and different variables (hence the term random). The predictions from the trees, collectively referred to as the "forest," may be then averaged together to produce the final prediction. Many trees (e.g., one hundred trees) may be included in a random forest model, with a number (e.g., 3, 6, 10, etc.) of terms sampled per split, a minimum of number (e.g., 1, 2, 4, 10, etc.) of splits per tree, and a minimum split size (e.g., 16, 32, 64, 128, 256, etc.). Random forests may be trained in a similar way as decision trees. Specifically, training a random forest may include the following operations: (1) select randomly k features from the total number of features; (2) create a decision tree from these k features using the same operations as for generating a decision tree; and (3) repeat the previous two operations until a target number of trees is created.

The systems, the methods, the computer-readable media, and the techniques disclosed herein may implement one or more long short-term memory (LSTM) techniques. LSTM may be an artificial neural network used in the fields of artificial intelligence and deep learning. Unlike standard feedforward neural networks, LSTM may use feedback connections. The LSTM architecture may provide a short-term memory for a recurrent neural network (RNN). Such RNN can process not only single data points (such as images), but also entire sequences of data (such as speech or video). This characteristic may mean that LSTM networks are well-suited for processing and predicting data. The name of LSTM may refer to the analogy that a standard RNN has both "long-term memory" and "short-term memory." The connection weights and biases in the RNN may change once per episode of training, analogous to how physiological changes in synaptic strengths store long-term memories; the activation patterns in the network may change once per time-step, analogous to how the moment-to-moment change in electric firing patterns in the brain store short-term memories. The LSTM architecture may provide a short-term memory for an RNN that can last many (e.g., thousands) timesteps.

In some cases, a LSTM unit may comprise a cell, an input gate, an output gate, and a forget gate. The cell may remember values over arbitrary time intervals and the input gate, the output gate, and the forget gate may regulate the flow of information into and out of the cell. Forget gates may be used to decide what information to discard from a previous state by assigning a previous state, compared to a current input, a value between 0 and 1 (e.g., a (rounded) value of 1 may mean to keep the information, and a value of 0 means to discard it). The input gate may decide which pieces of new information to store in the current state, using the same system as the forget gates. The output gate may control which pieces of information in the current state to output (e.g., by assigning a value from 0 to 1 to the information, considering the previous and current states). Selectively outputting relevant information from the current state may allow the LSTM network to maintain useful, long-term dependencies to make predictions, both in current and future time-steps. LSTM networks may be well-suited to classifying, processing and making predictions based on time series data, since there can be lags of unknown duration between important events in a time series. LSTMs may resolve the vanishing gradient problem that can be encountered when training traditional RNNs. Relative insensitivity to gap length may be an advantage of LSTM over RNNs, hidden Markov models and other sequence learning methods in numerous applications.

In some cases, LSTMs may be used with one or more various types of neural networks (e.g., convolutional neural networks (CNNs), deep neural network (DNNs), recurrent neural networks (RNNs), etc.). In some cases, CNNs, LSTM, and DNNs are complementary in their modeling capabilities and may be combined a unified architecture. For example, in such unified architecture, CNNs may be well-suited at reducing frequency variations, LSTMs may be well-suited at temporal modeling, and DNNs may be well-suited for mapping features to a more separable space. For example, input features to a ML model using LSTM techniques in the unified architecture may include segment features for each of a plurality of segments. To process the input features for each of the plurality of segments, the segment features for the segment may be processed using one or more CNN layers to generate first features for the segment; the first features may be processed using one or more LSTM layers to generate second features for the segment; and the second features may be processed using one or more fully connected neural network layers to generate third features for the segments, where the third features may be used for classification operations. In some examples, to process the first features using the one or more LSTM layers to generate the second features, the first features may be processed using a linear layer to generate reduced features having a reduced dimension from a dimension of the first features; and the reduced features may be processed using the one or more LSTM layers to generate the second features. Short-term features having a first number of contextual frames may be generated based on the input features, where features generated using the one or more CNN layers may include long-term features having a second number of contextual frames that are more than the first number of contextual frames of the short-term features. In some cases, the one or more CNN layers, the one or more LSTM layers, and the one or more fully connected neural network layers may have been jointly trained to determine trained values of parameters of the one or more CNN layers, the one or more LSTM layers, and the one or more fully connected neural network layers. In some cases, the input features may include log-mel features having multiple dimensions. The input features may include one or more contextual frames indicating a temporal context of a signal (e.g., input data). Advantageously, implementations for such unified architecture may leverage complementary advantages associated with each of a CNN, LSTM, and DNN. For example, convolutional layers may reduce spectral variation in input, which may help the modeling of LSTM layers. Having DNN layers after LSTM layers may help reduce variation in the hidden states of the LSTM layers. Training the unified architecture jointly may provide a better overall performance. Training in the unified architecture may also remove the need to have separate CNN, LSTM and DNN architectures, which may be expensive (e.g., in computational resource, in network traffic, in financial resources, in energy consumption, etc.). By adding multi-scale information into the unified architecture, information may be captured at different time scales.

The systems, the methods, the computer-readable media, and the techniques disclosed herein may implement one or more support vector machine learning techniques. In machine learning, support vector machines (SVMs) may be supervised learning models with associated learning algorithms that analyze data for classification and regression analysis. SVMs may be a robust prediction method, being based on statistical learning. SVMs may be well-suited for domains characterized by the existence of large amounts of data, noisy patterns, or the absence of general theories.

In general terms, SVMs may map input vectors into high dimensional feature space through non-linear mapping function, chosen a priori. In this high dimensional feature space, an optimal separating hyperplane may be constructed. The optimal hyperplane may then be used to determine things such as class separations, regression fit, or accuracy in density estimation. More formally, a SVM constructs a hyperplane or set of hyperplanes in a high or infinite-dimensional space, which can be used for classification, regression, or other tasks like outlier detection.

Support vectors may be defined as the data points that lie closest to the decision surface (or hyperplane). Support vectors may therefore be the data points that are most difficult to classify and may have direct bearing on the optimum location of the decision surface. Given a set of training examples, each marked as belonging to one of two categories, an SVM training algorithm may build a model that assigns new examples to one category or the other, making it a non-probabilistic binary linear classifier (although methods such as Platt scaling exist to use SVM in a probabilistic classification setting). SVM may map training examples to points in space so as to maximize the width of the gap between the two categories. New examples may then be mapped into that same space and predicted to belong to a category based on which side of the gap they fall. In addition to performing linear classification, SVMs can efficiently perform a non-linear classification using what is called the kernel trick, implicitly mapping their inputs into high-dimensional feature spaces.

Within a support vector machine, the dimensionally of the feature space may be large. For example, a fourth-degree polynomial mapping function may cause a 200-dimensional input space to be mapped into a 1.6 billionth dimensional feature space. The kernel trick and the Vapnik-Chervonenkis dimension may allow the SVM to thwart the "curse of dimensionality" limiting other methods and effectively derive generalizable answers from this very high dimensional feature space. Accordingly, SVMs may assist in discovering knowledge from vast amounts of input data.

The systems, the methods, the computer-readable media, and the techniques disclosed herein may implement one or more gradient boosting techniques. Gradient boosting is a machine learning technique used in regression and classification tasks, among others. It gives a prediction model in the form of an ensemble of weak prediction models, which are typically decision trees. When a decision tree is the weak learner, the resulting algorithm is called gradient-boosted trees; it usually outperforms random forest. A gradient-boosted trees model is built in a stage-wise fashion as in other boosting methods, but it generalizes the other methods by allowing optimization of an arbitrary differentiable loss function.

The systems, the methods, the computer-readable media, and the techniques disclosed herein may implement one or more K-nearest neighbors (KNN) techniques. KNN is a non-parametric classification method. In KNN classification, the output is a class membership. An object is classified by a plurality vote of its neighbors, with the object being assigned to the class most common among its k nearest neighbors (k is a positive integer, typically small). If k=1, then the object is assigned to the class of that single nearest neighbor. In KNN regression, the output is the property value for the object. This value is the average of the values of k nearest neighbors. KNN is a type of classification where the function is approximated locally and computation is deferred until function evaluation. Since this algorithm relies on distance for classification, if the features represent different physical units or come in vastly different scales then normalizing the training data can improve its accuracy dramatically.

The systems, the methods, the computer-readable media, and the techniques disclosed herein may implement one or more Monte Carlo techniques. Monte Carlo is a broad class of computational algorithms that rely on repeated random sampling to obtain numerical results. The underlying concept is to use randomness to solve problems that might be deterministic in principle.

The systems, the methods, the computer-readable media, and the techniques disclosed herein may implement one or more one-hot encoding techniques. One-hot encoding can be used to deal with categorical data. For example, an ML model can use input variables that are numeric. In one example, the categorical variables can be transformed in a pre-processing part. Categorical data can be either nominal or ordinal. Ordinal data can have a ranked order for its values and can therefore be converted to numerical data through ordinal encoding.

The systems, the methods, the computer-readable media, and the techniques disclosed herein may implement one or more quadratic discriminant analysis (QDA) techniques. In some cases, QDA may assume that the measurements from each class are normally distributed. In QDA there is no assumption that the covariance of each of the classes is identical. When the normality assumption is true, the best possible test for the hypothesis that a given measurement is from a given class is the likelihood ratio test.

The systems, the methods, the computer-readable media, and the techniques disclosed herein may implement one or more response surface methodology (RSM) techniques. RSM may explore the relationships between several explanatory variables and one or more response variables. RSM can use a sequence of designed experiments to obtain an optimal response. RSM can use a factorial experiment or a fractional factorial design. This may be sufficient to determine which explanatory variables affect the response variable(s) of interest. Once it is suspected that only significant explanatory variables are left, then a more complicated design, such as a central composite design can be implemented to estimate a second-degree polynomial model, which is still only an approximation at best. However, the second-degree model can be used to optimize (e.g., maximize, minimize, or attain a specific target for) the response variable(s) of interest.

The systems, the methods, the computer-readable media, and the techniques disclosed herein may implement one or more Synthetic Minority Oversampling Techniques (SMOTE). SMOTE is type of data augmentation for a minority class. SMOTE can select examples that are close in the feature space, drawing a line between the examples in the feature space and drawing a new sample at a point along that line.

Certain Definitions and Additional Considerations

Unless otherwise defined, all technical terms used herein have the same meaning as commonly understood by one of ordinary skill in the art to which the present subject matter belongs.

As used in this specification and the appended claims, the terms "artificial intelligence," "artificial intelligence techniques," "artificial intelligence operation," and "artificial intelligence algorithm" generally refer to any system or computational procedure that may take one or more actions to enhance or maximize a chance of achieving a goal. The term "artificial intelligence" may include "generative modeling," "machine learning" (ML), or "reinforcement learning" (RL).

As used in this specification and the appended claims, the terms "machine learning," "machine learning techniques," "machine learning operation," and "machine learning model" generally refer to any system or analytical or statistical procedure that may progressively improve computer performance of a task.

As used in this specification and the appended claims, "some embodiments," "further embodiments," or "a particular embodiment," means that a particular feature, structure, or characteristic described in connection with the embodiment is included in at least one embodiment. Thus, the appearances of the phrase "in some embodiments," or "in further embodiments," or "in a particular embodiment" in various places throughout this specification are not necessarily all referring to the same embodiment. Furthermore, the particular features, structures, or characteristics may be combined in any suitable manner in one or more embodiments.

As used in this specification and the appended claims, when the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

As used in this specification and the appended claims, when the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

As used in this specification, "or" is intended to mean an "inclusive or" or what is also known as a "logical OR," wherein when used as a logic statement, the expression "A or B" is true if either A or B is true, or if both A and B are true, and when used as a list of elements, the expression "A, B or C" is intended to include all combinations of the elements recited in the expression, for example, any of the elements selected from the group consisting of A, B, C, (A, B), (A, C), (B, C), and (A, B, C); and so on if additional elements are listed. As such, any reference to "or" herein is intended to encompass "and/or" unless otherwise stated.

As used in this specification and the appended claims, the indefinite articles "a" or "an," and the corresponding associated definite articles "the" or "said," are each intended to mean one or more unless otherwise stated, implied, or physically impossible. Yet further, it should be understood that the expressions "at least one of A and B, etc.," "at least one of A or B, etc.," "selected from A and B, etc." and "selected from A or B, etc." are each intended to mean either any recited element individually or any combination of two or more elements, for example, any of the elements from the group consisting of "A," "B," and "A AND B together," etc.

As used in this specification and the appended claims "about" or "approximately" may mean within an acceptable error range for the value, which will depend in part on how the value is measured or determined, e.g., the limitations of the measurement system. For example, "about" may mean within 1 or more than 1 standard deviation, per the practice in the art. Alternatively, "about" may mean a range of up to 20%, up to 10%, up to 5%, or up to 1% of a given value. Where values are described in the application and claims, unless otherwise stated the term "about" meaning within an acceptable error range for the particular value may be assumed.

While preferred embodiments of the present invention have been shown and disclosed herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention disclosed herein may be employed in practicing the invention. It is therefore contemplated that the invention shall also cover any such alternatives, modifications, variations, or equivalents. It is intended that the following claims define the scope of the invention and that methods and structures within the scope of these claims and their equivalents be covered thereby.

It should be noted that various illustrative or suggested ranges set forth herein are specific to their example embodiments and are not intended to limit the scope or range of disclosed technologies, but, again, merely provide example ranges for frequency, amplitudes, etc. associated with their respective embodiments or use cases. Where values are described as ranges, it will be understood that such disclosure includes the disclosure of all possible sub-ranges within such ranges, as well as specific numerical values that fall within such ranges irrespective of whether a specific numerical value or specific sub-range is expressly stated.

It should be understood that, unless a term is expressly defined herein, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are disclosed herein as including logic or a number of routines, subroutines, applications, or instructions. These may constitute either software (e.g., code embodied on a machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as disclosed herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, hardware modules may encompass a tangible entity, be that an entity that is physically constructed, permanently configured (e.g., hardwired), or temporarily configured (e.g., programmed) to operate in a certain manner or to perform certain operations disclosed herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information). Elements that are described as being coupled and or connected may refer to two or more elements that may be (e.g., direct physical contact) or may not be (e.g., electrically connected, communicatively coupled, etc.) in direct contact with each other, but yet still cooperate or interact with each other.

The various operations of example methods disclosed herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines disclosed herein may be at least partially processor-implemented. For example, at least some of the operations of a method may be performed by one or more processors or processor-implemented hardware modules. The performance of certain operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

What is claimed is:

1. A system for characterizing aggregate materials in a conveyor system, comprising:
   one or more lighting fixtures;
   one or more red, green, blue (RGB) cameras;
   one or more mechanical support fixtures, wherein each mechanical support fixture of the one or more mechanical support fixtures is configured to couple at least one lighting fixture of the one or more lighting fixtures and at least one RGB camera of the one or more RGB cameras to a location along the conveyor system such that the at least one RGB camera is positioned to capture image data of the aggregate materials at least in part while the aggregate materials are both illuminated by the at least one lighting fixture and are transported along the conveyor system; and
   a computing device, in direct or indirect communication with the one or more RGB cameras, the computing device comprising one or more processors configured to perform operations comprising:
   (i) obtaining the image data of the aggregate materials;
   (ii) analyzing, using a trained machine learning model, the image data of the aggregate materials to determine one or more physical properties of the aggregate materials and one or more chemical properties of the aggregate materials; and
   (iii) generating a characterization of the aggregate materials based at least in part on the one or more physical properties of the aggregate materials and the one or more chemical properties of the aggregate materials.

2. The system of claim 1, wherein the at least one RGB camera comprises at least two RGB cameras.

3. The system of claim 1, further comprising one or more infrared (IR) cameras, wherein the mechanical support structure is further configured to couple at least one IR camera of the one or more IR cameras to both the at least one lighting fixture and the at least one RGB camera at the location along the conveyor system such that the at least one IR camera is positioned to capture IR image data of the aggregate materials, and wherein the image data of the aggregate materials comprises the IR image data.

4. The system of claim 3, wherein the one or more IR cameras comprise one or more shortwave infrared cameras that each comprise a filter of about 1450 nanometers.

5. The system of claim 1, further comprising one or more sensors, wherein the mechanical support structure is further configured to couple at least one sensor of the one or more sensors to both the at least one lighting fixture and the at least one RGB camera at the location along the conveyor system such that the at least one sensor is positioned to capture sensor data of the aggregate materials, and wherein analyzing the image data of the aggregate materials using the trained machine learning model to determine the one or more physical properties of the aggregate materials and the one or more chemical properties of the aggregate materials comprises analyzing the sensor data using the trained machine learning model.

6. The system of claim 5, wherein the one or more sensors comprise one or both of a moisture probe or a load cell.

7. The system of claim 5, wherein the one or more sensors comprise a temperature sensor.

8. The system of claim 5, wherein the one or more sensors comprise a humidity sensor.

9. The system of claim 1, wherein the one or more processors are further configured to display, on a graphical interface, the characterization of the aggregate materials.

10. The system of claim 1, wherein the one or more processors are further configured to store, in a memory, the characterization of the aggregate materials.

11. The system of claim 1, wherein the characterization of the aggregate materials comprises one or more of aggregate moisture, particle size distribution, shape, surface qualities, material quantity, or cleanliness.

12. The system of claim 1, wherein the aggregate materials comprise both coarse aggregate and fine aggregate.

13. The system of claim 12, wherein the coarse aggregate comprises rock and the fine aggregate comprises sand.

14. The system of claim 1, wherein the conveyor system comprises one or more of a conveyor belt, a delivery truck, a mixer truck, a scale, or a bin.

15. The system of claim 1, wherein:
(i) the one or more mechanical support fixtures comprise a first mechanical support fixture and a second mechanical support fixture,
(ii) the first mechanical support fixture is configured to couple at least one first lighting fixture of the one or more lighting fixtures and at least one first RGB camera of the one or more RGB cameras to a first location along the conveyor system such that the at least one first RGB camera is positioned to capture first image data of the aggregate materials at least in part while the aggregate materials are illuminated by the at least one first lighting fixture at the first location along the conveyor system,
(iii) the second mechanical support fixture is configured to couple at least one second lighting fixture of the one or more lighting fixtures and at least one second RGB camera of the one or more RGB cameras to a second location along the conveyor system such that the at least one second RGB camera is positioned to capture second image data of the aggregate materials at least in part while the aggregate materials are illuminated by the at least one second lighting fixture at the second location along the conveyor system, and
(iv) the image data comprises the first image data and the second image data.

16. The system of claim 1, wherein the trained machine learning model comprises a deep learning model.

17. The system of claim 1, wherein the trained machine learning model comprises one or more of a convolutional neural network, a vision transformer, a long short-term memory network, a masked autoencoder, a random forest, or a support vector machine.

18. The system of claim 15, wherein the first location along the conveyor system is on a conveyor belt and wherein the second location along the conveyor system is a bin and wherein the second location along the conveyor system is downstream from first location along the conveyor system.

19. A method for characterizing aggregate materials in a conveyor system, comprising:
(a) illuminating, using one or more lighting fixtures coupled to the conveyor system via one or more mechanical support fixtures, the aggregate materials as the aggregate materials are transported along the conveyor system;
(b) capturing, using one or more red, green, blue (RGB) cameras coupled to the conveyor system via the one or more mechanical support fixtures, image data of the aggregate materials at least in part while the aggregate materials are illuminated by the one or more lighting fixtures at (a);
(c) obtaining, at a computing device in direct or indirect communication with the one or more RGB cameras, the image data of the aggregate materials;
(d) analyzing, at the computing device, using a trained machine learning model, the image data of the aggregate materials to determine one or more physical properties of the aggregate materials and one or more chemical properties of the aggregate materials; and
(e) generating, at the computing device, a characterization of the aggregate materials based at least in part on the one or more physical properties of the aggregate materials and the one or more chemical properties of the aggregate materials.

20. The method of claim 19, further comprising:
(f) capturing, using one or more sensors coupled to the conveyor system via the one or more mechanical support fixtures, sensor data of the aggregate materials, and wherein analyzing the image data of the aggregate materials using the trained machine learning model to determine the one or more physical properties of the aggregate materials and the one or more chemical properties of the aggregate materials at (d) comprises analyzing the sensor data using the trained machine learning model.

21. The method of claim 20, wherein the one or more sensors comprise one or more of a humidity sensor, a temperature sensor, a moisture probe, or a load cell.

22. The method of claim 19, further comprising:
(f) outputting the characterization of the aggregate materials.

23. The method of claim 19, wherein the trained machine learning model comprises a deep learning model.

24. The method of claim 19, wherein the trained machine learning model comprises a convolutional neural network, a vision transformer, a long short-term memory network, a random forest, or a support vector machine.

25. The method of claim 19, wherein the computing device comprises a cloud-based computing device.

26. The method of claim 25, wherein (d) analyzing using the trained machine learning model is performed on the cloud-based computing device.

27. One or more non-transitory computer-readable media comprising computer-executable instructions that, when executed by at least one processor, cause the at least one processor to perform operations comprising:
(a) illuminating, using one or more lighting fixtures coupled to the conveyor system via one or more mechanical support fixtures, the aggregate materials as the aggregate materials are transported along the conveyor system;
(b) capturing, using one or more red, green, blue (RGB) cameras coupled to the conveyor system via the one or more mechanical support fixtures, image data of the aggregate materials at least in part while the aggregate materials are illuminated by the one or more lighting fixtures at (a);
(c) obtaining, from the one or more RGB cameras, the image data of the aggregate materials;
(d) analyzing, using a trained machine learning model, the image data of the aggregate materials to determine one or more physical properties of the aggregate materials and one or more chemical properties of the aggregate materials; and (e) generating a characterization of the aggregate materials based at least in part on the one or more physical properties of the aggregate materials and the one or more chemical properties of the aggregate materials.

\* \* \* \* \*